US005786998A

United States Patent [19]

Neeson et al.

[11] Patent Number: 5,786,998

[45] Date of Patent: Jul. 28, 1998

[54] APPARATUS AND METHOD FOR TRACKING REPORTING AND RECORDING EQUIPMENT INVENTORY ON A LOCOMOTIVE

[75] Inventors: Michael J. Neeson; Edward L. Furman, both of Omaha, Nebr.

[73] Assignee: Automated Monitoring and Control International, Inc., Omaha, Nebr.

[21] Appl. No.: 445,528

[22] Filed: May 22, 1995

[51] Int. Cl.[6] .................................. H04B 1/00; G01S 7/00

[52] U.S. Cl. .................... 364/424.01; 364/452; 364/403; 340/825.06; 342/42; 455/54.1

[58] Field of Search .............................. 364/424.01, 449, 364/452, 403, 408; 340/825.54, 825.55, 825.06, 825.08, 825.15; 342/42, 44, 58, 457; 455/39, 54.1, 54.2, 99

[56] References Cited

U.S. PATENT DOCUMENTS

| | | | |
|---|---|---|---|
| 4,797,948 | 1/1989 | Milliorn et al. | 455/54 |
| 4,897,642 | 1/1990 | DiLullo et al. | 340/825.06 |
| 5,122,959 | 6/1992 | Nathanson et al. | 364/436 |
| 5,432,841 | 7/1995 | Rimer | 379/59 |
| 5,548,818 | 8/1996 | Sawyer et al. | 455/54.1 |

*Primary Examiner*—Kevin J. Teska
*Assistant Examiner*—Tan Nguyen
*Attorney, Agent, or Firm*—John A. Beehner

[57] ABSTRACT

An apparatus for tracking reporting and recording equipment inventory on a locomotive equipped with a mobile communications package (MCP) operatively connected to on-board intelligent devices and operative to transmit and receive information to and from at least one remote base communications unit, the intelligent devices operatively connected in a local communication network, the apparatus including a processing device operative to broadcast a Query for Health Report to on-board intelligent devices and receive Health Reports Messages from on-board intelligent devices, wherein the Query for Health Report is a request for equipment identification information and the Health Report Messages are the requested equipment identification information. A database in information transmission connection with the processing device is operative to receive and store equipment identification information. A polling device periodically initiates Queries for Health Reports to the on-board intelligent devices, and the updated Health Reports are stored in a temporary information storage database. The equipment identification information in the first database is compared to the most recent equipment identification information stored in the temporary database by a comparison device which determines changes in devices on the locomotive. Finally, reporting and notifying devices in information transmission connection with the processing device report equipment on-board the locomotive and notify an operator of a change of equipment on a locomotive.

13 Claims, 28 Drawing Sheets

| DELETIONS | IN CONTACT RECOVERS IN DOWNED_DEVICE_DELAY_TIME | IN CONTACT DOES NOT RECOVER IN DOWNED_DEVICE_DELAY_TIME |
|---|---|---|
| SINGLE DEVICE/CLIENT DELETION | NO REPORT | EQUIP_CHANGE_RPT(98.2.3) device deleted |
| SINGLE DEVICE MULTIPLE CLIENT DELETION | NO REPORT | EQUIP_CHANGE_RPT(98.2.3) device deleted |
| MULTIPLE DEVICE MULTIPLE CLIENT DELETION | NO REPORT | EQUIP_LIST_RPT(98.4.2)<br><br>[EQUIP_CHANGE_RPT (device deleted) for each device] |
| MULTIPLE DEVICE CHAIN / SINGLE DEVICE LOST | NO REPORT | EQUIP_CHANGE_RPT(98.2.3) device deleted |
| NO DEVICE CHANGE / SINGLE CLIENT DELETION | NO REPORT | NO REPORT |
| NO DEVICE CHANGE MULTIPLE CLIENT DELETION | NO REPORT | NO REPORT |

FIG. 3A

| OUT OF CONTACT RECOVERS IN DOWNED_DEVICE_DELAY_TIME | OUT OF CONTACT DOES NOT RECOVER IN DOWNED_DEVICE_DELAY_TIME NO RECOVERY BEFORE CONTACT REGAINED | OUT OF CONTACT DOES NOT RECOVER IN DOWN_DEVICE_DELAY_TIME RECOVERS BEFORE CONTACT REGAINED |
|---|---|---|
| NO REPORT | ON REGAIN_CONTACT EQUIP_CHANGE_RPT(98.2.3) device deleted | NO REPORT |
| NO REPORT | ON REGAIN_CONTACT EQUIP_CHANGE_RPT(98.2.3) device deleted | NO REPORT [EQUIP_CHANGE_RPT (device added)] |
| NO REPORT | ON REGAIN_CONTACT EQUIP_LIST_RPT(98..4.2) [EQUIP_CHANGE_RPT (device deleted) for each device] | NO REPORT [EQUIP_LIST_RPT] |
| NO REPORT | ON REGAIN_CONTACT EQUIP_CHANGE_RPT(98.2.3) device deleted | NO REPORT [EQUIP_CHANGE_RPT (device added)] |
| NO REPORT | NO REPORT | NO REPORT |
| NO REPORT | NO REPORT | NO REPORT |

FIG. 3B

| ADDITIONS | IN CONTACT<br>NO CHANGE IN<br>CHANGE_TIMEOUT | IN CONTACT<br>DELETED IN<br>DOWNED_DEVICE_DELAY_TIME |
|---|---|---|
| SINGLE CLIENT /<br>NO NEW DEVICE<br>ADDITION | NO REPORT | NO REPORT |
| SINGLE CLIENT /<br>SINGLE NEW DEVICE<br>ADDITION | EQUIP_CHANGE_RPT(98.2.3)<br>device added | EQUIP_CHANGE_RPT(98.2.3)<br>device added<br>followed by<br>EQUIP_CHANGE_RPT(98.2.3)<br>device deleted<br>[NO REPORT] |
| MULTIPLE CLIENT /<br>SINGLE NEW DEVICE<br>ADDITION | EQUIP_CHANGE_RPT(98.2.3)<br>device added | EQUIP_CHANGE_RPT(98.2.3)<br>device added<br>followed by<br>EQUIP_CHANGE_RPT(98.2.3)<br>device deleted<br>[NO REPORT] |
| MULTIPLE CLIENTS /<br>MULTIPLE NEW DEVICE<br>ADDITION | EQUIP_LIST_RPT(98.4.2) | EQUIP_LIST_RPT(98.4.2)<br><br>[NO REPORT] |

FIG. 3C

| OUT OF CONTACT<br>ADDED WITH NO CHANGE | OUT OF CONTACT<br>DELETED IN BEFORE REGAIN<br>OF CONTACT | OUT OF CONTACT |
|---|---|---|
| NO REPORT | NO REPORT | NO REPORT |
| EQUIP_CHANGE_RPT(98.2.3)<br>device added | EQUIP_CHANGE_RPT(98.2.3)<br>device added<br>followed by<br>EQUIP_CHANGE_RPT(98.2.3)<br>device deleted<br>[NO_REPORT] | EQUIP_CHANGE_RPT(98.2.3)<br>device added<br>followed by<br>EQUIP_CHANGE_RPT(98.2.3)<br>device deleted<br>[NO_REPORT] |
| EQUIP_CHANGE_RPT(98.2.3)<br>device added | EQUIP_CHANGE_RPT(98.2.3)<br>device added<br>followed by<br>EQUIP_CHANGE_RPT(98.2.3)<br>device deleted<br>[NO_REPORT] | EQUIP_CHANGE_RPT(98.2.3)<br>device added<br>followed by<br>EQUIP_CHANGE_RPT(98.2.3)<br>device deleted<br>[NO_REPORT] |
| EQUIP_LIST_RPT(98.4.2) | EQUIP_LIST_RPT(98.4.2)<br><br>[NO REPORT] | EQUIP_LIST_RPT(98.4.2)<br><br>[NO REPORT] |

FIG. 3D

| STATE-> EVENT | STARTUP (1) | OUT-OF-CONTACT IDLE (2) | OUT-OF-CONTACT CHANGE PENDING (3) | OUT-OF-CONTACT REPORT OUTSTANDING (4) | IDLE (5) | CHECK DEVICE TABLE (6) | REPORT OUTSTANDING (7) | CHANGE PEND, REPORT OUTSTANDING (8) |
|---|---|---|---|---|---|---|---|---|
| CHK_TBL_TO | | | | | | PROC_CHK_TO, GEN_RPT-0:(5) GEN_RPT-1:(7) | | |
| STARTUP_TO | OUT_CNTC:(3) IN_CNTC: CHECK_TBL,(6) | (3) | - | | | | | |
| CHANGE_TO | | (3) | - | | CHECK_TBL,(6) | CHECK_TBL | (8) | - |
| RESEND_TO | | - | - | (3) | | | GEN_RPT-0:(5) GEN_RPT-1:- | |
| PERIODIC_TO | | - | - | - | GEN_TBL_RPT,(7) | - | - | - |
| HEALTH_RPT | PROC_HEALTH | PROC_HEALTH | PROC_HEALTH | PROC_HEALTH=0:- PROC_HEALTH=1:(3) | PROC_HLTH=0:- PROC_HLTH=1: GEN_CHG_RPT,(7) | PROC_HEALTH | PROC_HLTH-0:- PROC_HLTH=1:(8) | PROC_HEALTH |
| DELIV_OK | | | PROC_SUCCESS | PROC_SUCCESS,(2) | | | PROC_SUCCESS(5) | PROC_SUCCESS CHECK_TBL,(6) |
| DELIV_BAD | | | PROC_FAIL | PROC_FAIL,(3) | | | PROC_FAIL RESEND_TMR | PROC_FAIL, CHECK_TBL,(6) |
| LOST_CONTCT | (1) | | | | (2) | (3) | (4) | (3) |
| REG_CONTACT | (1) | (5) | CHECK_TBL,(6) | (7) | | | | |
| PORT_UP | - | (3) | - | | CHECK_TBL,(6) | CHECK_TBL | (8) | - |
| PORT_DOWN | | (3) | - | (3) | START_CHG_TMR | START_CHG_TMR | (8) | - |
| CLIENT_CHNG | | (3) | - | (3) | START_CHG_TMR | START_CHG_TMR | (8) | - |
| REPORT_REQ | - | GEN_TBL_RPT,(4) | GEN_TBL_RPT,(4) | - | REBUILD=0: REBUILD_TBL,(6) REBUILD=1: GEN_TBL_RPT,(7) | - | - | = |
| ALERTS_PARMS | PROC_PARMS | PROC_PARMS | PROC_PARMS | PROC_PARMS | PROC_PARMS | PROC_PARMS | PROC_PARMS | PROC_PARMS |

FIG. 4

APPARATUS AND METHOD FOR TRACKING REPORTING AND RECORDING EQUIPMENT INVENTORY ON A LOCOMOTIVE

BACKGROUND OF THE INVENTION

1. Technical Field

This invention relates to apparati and methods for tracking and recording equipment inventory and, more particularly, to an apparatus and method for tracking, reporting and recording equipment inventory on a locomotive equipped with a mobile communications package which provides for automatic reporting of the equipment configuration on and/or loss of contact with the equipment on the locomotive.

2. Description of the Prior Art

Real-time communications between field units and dispatchers in railroad systems is a rapidly growing field of endeavor. Several examples are found in the prior art which disclose forms of communications systems, such as Tyburski et al., U.S. Pat. No. 4,912,471, which discloses an interrogator-responder communications system in which responders are carried by vehicles such as railroad vehicles traveling along a route in which an interrogating station situated along the route operates each passing responder to recall data from a memory in the passing responder. Another example of a railroad communications system is found in Raj, U.S. Pat. No. 5,008,661, which discloses an electronic remote chemical identification system in which a transponder for recording information regarding the contents and other information of a railroad tank car, highway tank truck or other container is placed thereon, the transponder being coded remotely with the information by remotely located, fixed or portable coders and interrogated when desired by remotely located, fixed or portable interrogator units. Neither of these systems, however, is designed for use with equipment already installed and in place on a locomotive, and in fact would require installation of additional equipment in the already limited space available on board the locomotive. Furthermore, neither of these systems is designed to transmit data from the railroad vehicle to the remote location regarding the equipment installed on board the railroad vehicle, particularly those intelligent devices connected in a local communications network on-board the locomotive. There is therefore a need for a communications system which is capable of transmitting information regarding on-board equipment on a locomotive to a remote location without requiring installation of space-consuming equipment on the locomotive.

Presently, there are several railroad industry communications systems in operation, an example of which is the base networking system manufactured by AMCI of Nebraska. The AMCI Base Networking System (ABNS) is a general purpose message routing, stationary and mobile data communications and applications support facility. Essentially ABNS is a communications system for railroads for communication between a dispatcher and field units such as locomotives, rubber tire vehicles, trackside equipment and yard and terminal operations, in which the data being communicated consists of train control, location and speed monitoring, track warrants and bulletins and work order reporting. ABNS communicates via a software-based system which resides in a front end processor located at computer control headquarters and is based on the ATCS (Advanced Train Control System) standard. ABNS communicates with various field units through a plurality of base stations located alongside tracks throughout the railroad system. The base stations are radio transmitter/receivers which enable real-time communications between the base stations and field units within transmitting/receiving range of the base station.

In ABNS, communications with locomotives is initiated through the base stations, which are in contact with mobile communications packages (MCP) on board the locomotives. The MCP may be operatively connected to one or more on-board intelligent devices on the locomotives such as an on-board computer, so that information such as work order reports may be taken. Clearly, then, there is a system already in place which provides for real-time communications between the on-board intelligent devices of a locomotive and a dispatcher or railroad employee at the central computer location. However, while ABNS presently provides such applications as work order reporting and location monitoring, ABNS does not provide any sort of equipment inventory tracking, reporting and recording system, and with the growth and complexity of the equipment on board locomotives, there is increasingly a need for such a system. Of course, it is to be understood that the term "on-board computer" refers to any on-board computing device and not only to ATCS standard on-board computers. Also, the term "intelligent devices" refers to any device having the ability to communicate over the local communications network on-board the locomotive, specifically, that the device have the ability to receive and understand a Query for Health Report and respond with a Health Report Message.

Successful operation of a railroad system depends upon maintaining a fleet of properly equipped locomotives. When a locomotive is assigned to a particular job, it is vitally important that that locomotive include equipment necessary to correctly perform the job. At the present time, however, there is no communications system available which provides for real-time updates of equipment inventory on board particular locomotives. There is therefore a need for an inventory control system which will provide updated equipment lists for particular locomotives so that job assignments may be properly designated.

Another problem encountered in the railroad industry is that much of the equipment presently in place on locomotives is of the type which may be relatively quickly and easily removed from the locomotive, such as portable computers, operating displays, and other intelligent computing devices. An increasing problem in the railroad industry is the theft and/or misplacement of these easily portable devices. It is important for dispatchers to receive real-time updates regarding easily portable equipment installed on locomotives to attempt to prevent theft or misplacement of the equipment. When portable equipment such as described above is placed on board a locomotive, it is commonly connected to the on-board systems of the locomotive to enable monitoring of those systems. At present, however, a dispatcher or inventory control monitor has no way of knowing what portable equipment is connected on-board the locomotive at any given time, and therefore is uninformed when that portable equipment is removed from connection with on-board systems. There is therefore a need for an inventory control system which will keep track of portable equipment connected to the on-board systems and substantially immediately inform a dispatcher or inventory control monitor upon removal of the portable equipment from connection with those on-board systems.

Consequently, an object of the present invention is to provide an apparatus and method for tracking, reporting and recording equipment inventory on a locomotive.

Another object of the present invention is to provide an apparatus and method for tracking, reporting and recording equipment inventory on a locomotive equipped with a mobile communications package operatively connected to on-board intelligent devices and operative to transmit and receive information to and from at least one remote base communications unit, the intelligent devices operatively connected in a local communications network, the apparatus including a processing device, equipment identification storage structure, a polling device, a temporary information storage device, a comparing device and a reporting and notifying device, all of which cooperate to inform a remote dispatcher of equipment changes and inventory on-board the locomotive.

Another object of the present invention is to provide an apparatus for tracking, reporting and recording equipment inventory on a locomotive in which the processing device is operative to broadcast a Query for Health Report to intelligent devices on-board the locomotive and receive Health Report messages from those devices, wherein the Query for Health Report comprises a request for equipment identification information and the Health Report messages comprise the requested equipment identification information.

Another object of the present invention is to provide an apparatus for tracking, reporting and recording equipment inventory on a locomotive which is adapted to be used with a base networking system which operates according to the Advanced Train Control System standard.

Another object of the present invention is to provide an apparatus for tracking, reporting and recording equipment inventory on a locomotive wherein the processing device is a locomotive equipment tracking software application.

Another object of the present invention is to provide a method for tracking, reporting and recording equipment inventory on a locomotive equipped with a mobile communications package which includes providing those elements discussed previously, connecting the processing device to intelligent devices on-board the locomotive through a local communications network in which the intelligent devices are connected, broadcasting a Query for Health Report through the processing means to those intelligent devices, receiving Health Report messages through the processing device, monitoring the network to determine the operative status of intelligent devices in the local communications network, comparing the Health Report messages received previously to updated Health Report messages, then reporting any differences in the updated Health Report messages to an operator in real time at a remote location.

Another object of the present invention is to provide a method as described above wherein the step of reporting differences in the updated Health Report messages further includes reporting malfunctions, thefts, destructions and systems updates of equipment operatively connected to an on-board computer.

Finally, an object of the present invention is to provide an apparatus and method for tracking, reporting and recording equipment inventory on a locomotive which is efficient and practical in use and effectively conveys equipment inventory information to a location remote from the locomotive.

SUMMARY OF THE INVENTION

The present invention provides an apparatus for tracking, reporting and recording equipment inventory on a locomotive equipped with a mobile communications package (MCP) operatively connected to on-board intelligent devices and operative to transmit and receive information to and from at least one remote base communications unit, the intelligent devices operatively connected in a local communications network. The apparatus includes a processing device operative to broadcast a Query for Health Report to on-board intelligent devices and receive Health Report messages from on-board intelligent devices, wherein the Query for Health Report comprises a request for equipment identification information and the Health Report messages comprise the requested equipment identification information. An equipment identification information storage device is placed in information transmission connection with the processing device, the storage device operative to receive and store equipment identification information received by the processing device via the Health Report messages. A polling device is operatively connected to the processing device for periodically initiating broadcast of a Query for Health Report to on-board intelligent devices in the local communications network on the locomotive. A temporary information storage device is placed in information transmission connection with the processing device for additionally receiving and storing recently received equipment identification information from a locomotive via Health Report messages received in response to a Query for Health Report. A comparison device in the processing device is provided for comparing equipment identification information in the temporary information storage device to equipment identification information in the equipment identification information storage device for a particular locomotive to determine changes in intelligent equipment on the locomotive. Finally, reporting and notifying devices are provided in information transmission connection with the processing device for reporting intelligent equipment on-board a locomotive and for notifying an operator of a change of equipment on a locomotive.

The present invention also provides a method of tracking, reporting and recording equipment inventory on a locomotive equipped with a mobile communications package (MCP) operatively connected to on-board intelligent devices and operative to transmit and receive information to and from at least one remote base communications unit, the on-board intelligent devices operatively connected in a local communications network. The method includes the steps of providing a processing device, equipment identification information storage devices, a monitoring device, a polling device, a temporary information storage device, a comparison device and reporting and notifying devices. The processing device is operatively connected to the on-board intelligent devices, the processing device, equipment identification information storage device and temporary information storage device all connected in information transmission connection. A Query for Health Report is broadcast through the processing device to the on-board intelligent devices via the local communications network, the Query for Health Report comprising a request for equipment identification. Health Report messages are received through the processing device from the on-board intelligent devices, the Health Report messages comprising equipment identification information for intelligent equipment operatively connected to the on-board processing device. Those received Health Report messages are then stored in the equipment identification information storage device. The local communications network is monitored through the monitoring device to determine activation status of intelligent equipment operatively connected to the local communications network and a broadcast of a Query for Health Report is initiated through the polling device to intelligent devices in the network in response to the monitoring device registering a change of equipment. The updated Health Report messages are received by the processing device and stored in the temporary information storage device. These updated Health Report messages are then compared to the Health Report messages stored in the equipment identification storage device through the comparison device. Any differences in the updated Health Report messages as compared to the Health Report messages previously received are reported through the reporting and notifying devices such that equipment changes are reported to an operator in real time at a remote location. The older Health Report messages stored in the equipment identification information storage device are then replaced by the updated Health Report messages stored in the temporary information storage device such that the most recent updated Health Report messages are stored within the equipment identification information storage device.

An important element of the apparatus and method of the present invention is that the processing device will not attempt to send equipment inventory information to a remote location if the locomotive is not in contact with the ground network of the stations. This feature prevents the "tying up" of the radio transmitter in the mobile communications package with repeated attempts to transmit the equipment identification information. This is important because the MCP is commonly a half-duplex device, which means that although one radio frequency is used for incoming messages and another is used for outgoing messages, the MCP cannot receive and transmit messages simultaneously. If the MCP is constantly attempting to transmit equipment identification information while the locomotive is out-of-range, the MCP may not be able to receive important emergency information from the dispatcher upon returning to contact with the ground network.

It is thus seen that the present invention provides an apparatus and method for tracking, reporting and recording equipment inventory on the locomotive which is superior in many respects to those apparati and methods found in the prior art. For example, the present invention supplies real-time updates on equipment inventory status to dispatchers and/or equipment supervisors at remote locations. Also, because the present invention can be set to automatically poll the on-board intelligent devices to determine equipment status, it is unnecessary for the locomotive engineer or other person to manually broadcast a Query for Health Report. In this way, the dispatcher and/or equipment supervisor are notified if changes in equipment occur, thus reducing the need for constant monitoring of data received from the locomotive. Furthermore, because updated equipment lists are easily producible with the present invention, locomotives may be best assigned to various jobs based on equipment on-board the locomotive. Finally, as the present invention is intended in large part to be a software application, it may be quickly and easily added to the mobile communications package preferably installed on a locomotive. Therefore, the present invention provides a substantial improvement over those devices found in the prior art.

BRIEF DESCRIPTION OF THE DRAWINGS

FIGS. 3*a*, 3*b*, 3*c*, 3*d* and 4 are state description charts which display the result of various actions in various program states;

Finally.

DESCRIPTION OF THE PREFERRED EMBODIMENTS

Figure 1:
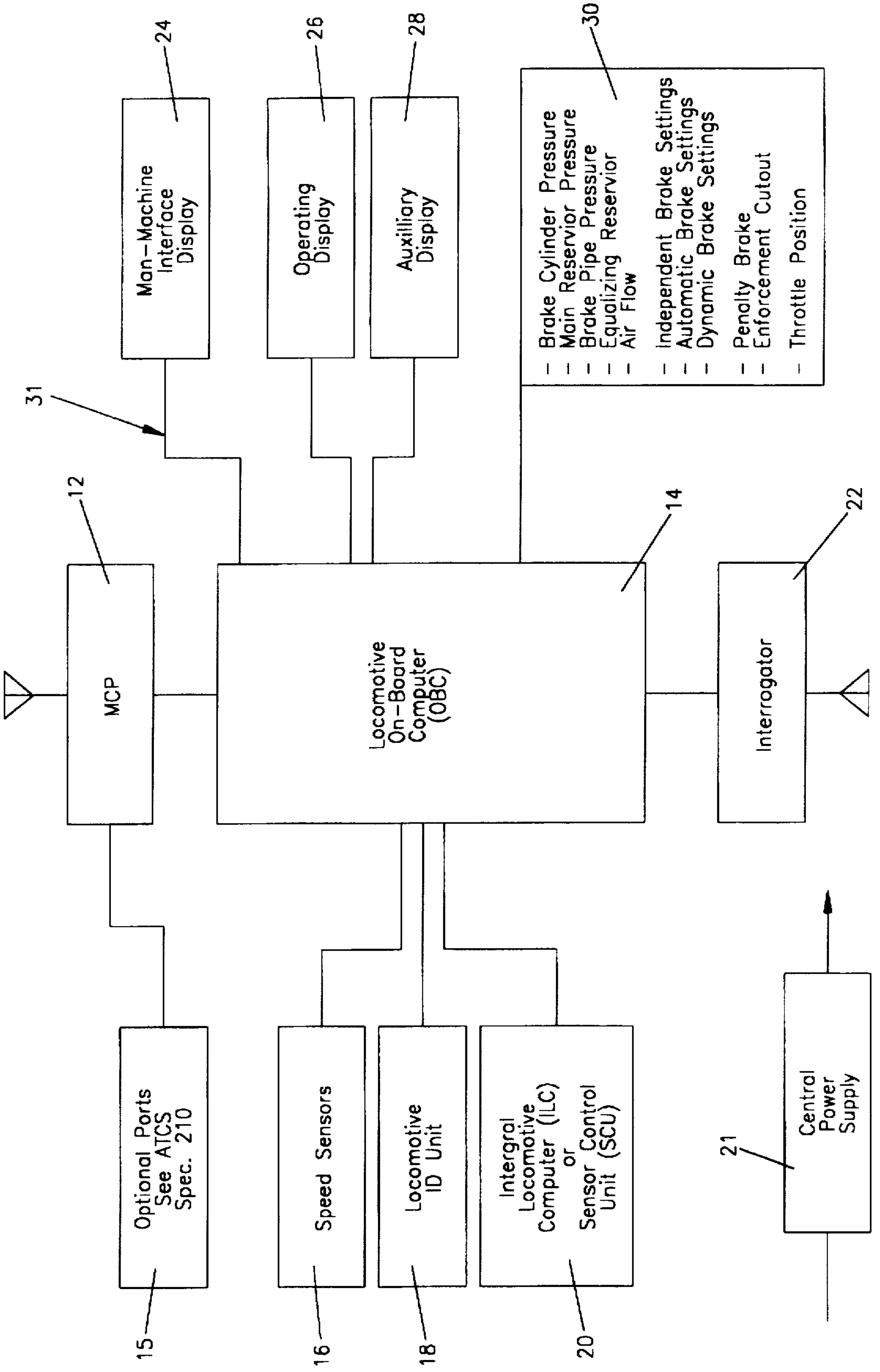
FIG. 1 is a high-level block diagram of a typical computer installation on board a locomotive.
Figure 2:
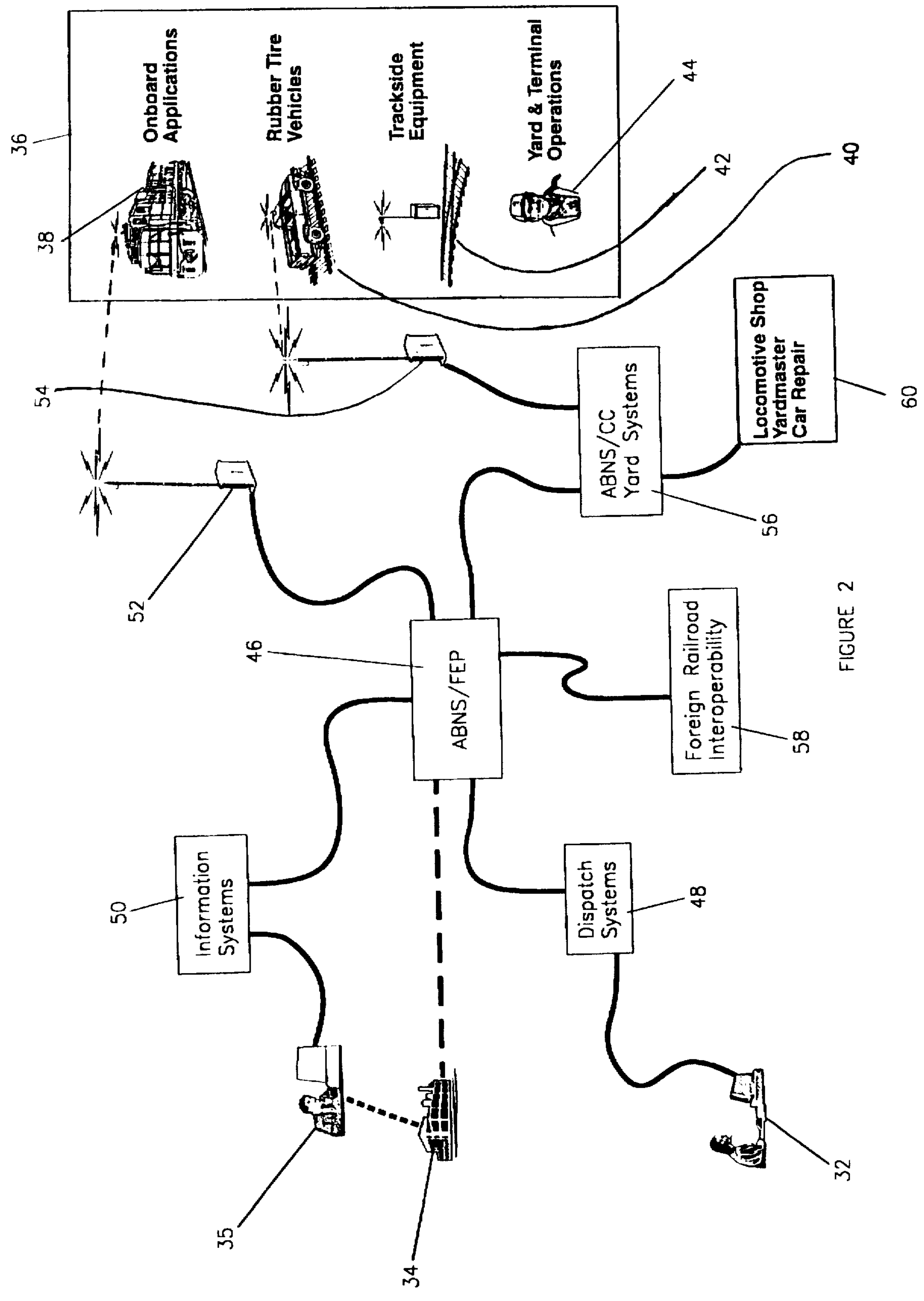
FIG. 2 is a high-level organizational diagram exhibiting a typical layout of a base networking system.

The apparatus and method for tracking, reporting and recording equipment inventory on a locomotive of the present invention is designed to be implemented with equipment already installed on a typical locomotive. By way of background, FIG. 1 illustrates a typical system organization on board a locomotive, and FIG. 2 illustrates a standard base networking system which provides a communications link between a dispatcher and/or a customer and a number of field units. Specifically, FIG. 1 shows a mobile communications packages (MCP) 12 which is in information transmission connection with a locomotive on-board computer (OBC) 14. Again, it is to be understood that the term "on-board computer" refers to any on-board computing device and not only to ATCS standard on-board computers. Typically, communications between locomotives and dispatchers is performed using protocols developed and implemented by Advanced Train Control Systems (ATCS). The MCP as understood in the present invention is a fully integrated communications package suitable for both mobile and fixed data radio communications in an ATCS environment. The standard MCP is made up of a mobile, frequency agile data radio and a multi-protocol communications controller with an RF modem, and thus is able to receive and transmit messages in a half duplex operation.

The on-board computer 14 is typically a standard microcomputer which is operatively connected to the various control and data devices on the locomotive. As shown in FIG. 1, these include such devices as speed sensors 16, the locomotive ID unit 18, the integral locomotive computer 20, the interrogator 22, the man-machine interface display 24, the operating display 26, the auxiliary display 28 and the brake and throttle controls and settings 30. Of those devices listed, the intelligent devices include the locomotive computer 20, the interrogator 22, the man-machine interface display 24, the operating display 26 and the auxiliary display 28. In a preferred locomotive environment, each of the intelligent devices would be linked together in a local communications network 31 which permits transmission of information between intelligent devices and further permits broadcasting of requests over the entire network. As was previously stated, the term "intelligent devices" refers to any devices having the ability to communicate over the local communications network on-board the locomotive. Specifically, an intelligent device would have the ability to receive and understand a Query for Health Report broadcast over the network and respond with a Health Report Message which includes equipment identification information for the particular intelligent device. This equipment identification information would preferably at a minimum include the serial number of the equipment, the manufacturer ID number, the hardware version level and software/firmware version level.

FIG. 2 exhibits a typical base networking system which allows communications between a dispatcher 32 or a customer 34 and MCP-equipped field units such as locomotives 38, rubber-tired vehicles 40, trackside equipment 42 and yard and terminal operations 44. The base networking system shown in FIG. 2 was developed by Automated Monitoring and Control International, Inc. of Nebraska and is referred to in this description as the AMCI Base Networking System (ABNS). ABNS includes as a central feature the front end processor (FEP) 46 which includes much of the communications system software in what is typically a miniframe computer such as those designed by the Tandem Corporation of California. Of course, the ABNS could be implemented in a UNIX environment or even in a distributed network of personal computers.

The FEP 46 facilitates communications between the dispatcher 32 and field units 36 and between the customer 34 and field units 36. The front end processor 46 also includes various databases which include information regarding the location of the various field units 36 in the ABNS system. One of the more important and useful databases is formed by the locomotive monitor or LMON process within the FEP 46. This process tracks the location of locomotives in the rail environment and stores the location information in an easily accessable database for use by other procedures. The front end processor 46 is most commonly physically located at railroad headquarters. Both the dispatcher 32 and customer service representative 35 operate through systems designed to access the information required by the dispatcher 32 and customer service representative 35. Specifically, the dispatcher 32 communicates with the front end processor 46 through a dispatch system 48 which is designed to track the location of the various field units 36 and also to allow for real-time communications with field operators in the field units 36. Similarly, the customer service representatives 35 may communicate with the front end processor 36 through information systems 50 which generally allow access to information regarding the location and job assignment of the various field units 36 but in most instances does not allow for real-time communications with the field units 36.

Data communications between the front end processor 46 and field units 36 are facilitated through a plurality of base stations 52 and 54. Each of the base stations 52 and 54, also known as base communications packages, preferably consists of a radio base station, a communications controller and associated cables for connectivity. Each base station 52 and 54 is preferably located alongside a railroad track, with the base stations being spaced apart along the length of the track such that as a field unit 36 moves along the track, it remains in radio contact range of the nearest base station and is "passed off" to the next base station along the track. Hundreds of base stations are situated along railroad tracks throughout the railroad system, thus enabling field units 36 to remain in contact with a dispatcher 32 or customer service representative 35. In other words, the base stations 52 and 54 provide the interface from the ground network which connects the base stations 52 and 54 with the front end processor 46 and the radio frequency network which connects the base stations 52 and 54 and field units 36.

To provide data communications between the front end processor 46 and base stations 52 and 54, it is preferred that a cluster controller 56, which is preferably a specialized software application for telephone line switching, be operatively connected with each of the base stations 52 and 54. Among the functions of the cluster controller are to eliminate duplicate reports from two or more base units and to efficiently route outgoing messages to the appropriate destination. It is preferred that each base station 52 and 54 be connected to the cluster controller 56 by a communications link such as a phone line to allow for efficient data communications and transmission between the cluster controller 56 and base stations 52 and 54. It is the entire communications linkage between the front end processor 46, cluster controller 56 and base stations 52 and 54 that is referred to as the ground network. The front end processor 46 may accurately track the location of any field unit 36 based on which base station 52 and 54 is being used to maintain radio contact with the field unit 36 via SSI (the signal strength indicator in ABNS) which compares the signal strength of the incoming signal to a full strength signal to determine the distance between the field unit 36 and the receiving base station 52 and 54.

Finally, in the base networking system shown in FIG. 2, communications with foreign railroads 58 and with the locomotive shop or car repair shop 60 may also be maintained through the front end processor 46. Real-time communications may thus be maintained between the field units 36 and dispatcher 32 and/or customer service representative 35.

The base networking system enables communications contact with the on-board computer 14 on a locomotive via the mobile communications package 12. Speed and control information may thus be sent from the locomotive 38 through the MCP 12 through the base stations 52 and 54 to the front end processor 46 where that information is stored in a particular address allocated to the particular locomotive 38. Likewise, traffic control information and the like may be sent from the dispatcher 32 through the front end processor 46 to the base station 52 and 54 and from there to the mobile communications package 12 on board the locomotive 38 to coordinate locomotive movement throughout the railroad system.

The automated locomotive equipment reporting and tracking system (ALERTS) 10 of the present invention is designed to utilize the base networking system in order to allow a dispatcher 32 or customer service representative 35 to obtain equipment information from field units 36 automatically via remote commands. To utilize the base networking system as shown in FIG. 2 and described above, the ALERTS 10 is preferably located within three systems connected via the network, the customer host system 34, the front end processor 46 and the mobile communications package 12 on board the locomotive. In this division, the ALERTS portion in the customer host system 34 provides the up-to-date information to railroad personnel on available equipped locomotives 38. The ALERTS portion located in the front end processor 46 provides updates to the dispatcher 32 or customer 34 on equipment additions, replacements, outages and removals. Finally, the ALERTS application in the mobile communications package 12 monitors the on-board intelligent devices and reports initial configuration and configuration changes to the front end processor 46. Each of these portions of the ALERTS will be discussed in detail below.

FIGS. **5*a*–24 are flowcharts which illustrate the various routines and subroutines for the ALERTS application on board the locomotive. ALERTS on board the locomotive is built around the mobile communications package 12 and the Advanced Train Control System architecture used for communications within the base networking system 31. When the MCP 12 powers up, it will initialize normally and go through its ground contact procedures. These procedures are well known in the art and simply act to establish communications with the front end processor 46**.

FIGS. **5*a* and 5*b* illustrate a high-level flowchart which discloses the locomotive equipment reporting and tracking system 10 of the present invention. When the MCP 12 is powered up, the ALERTS application comes on and creates any resources necessary, such as timers, queues and memory allocation within the mobile communications package. An initialization to a timer is then started which acts to delay the queries for equipment identification to allow the on-board network to stabilize before establishing the equipment table. The default setting on the delay timer is 120** seconds, although this is configurable as desired. The variable ALERTS_STATE is set to the value STARTUP, then, upon elapsing of the timer, the variable ALERTS_EVENT is set to equal the first value on the ALERTS_EVENT queue, which in the preferred embodiment will be set to the value STARTUP_TO.

Figure 6:
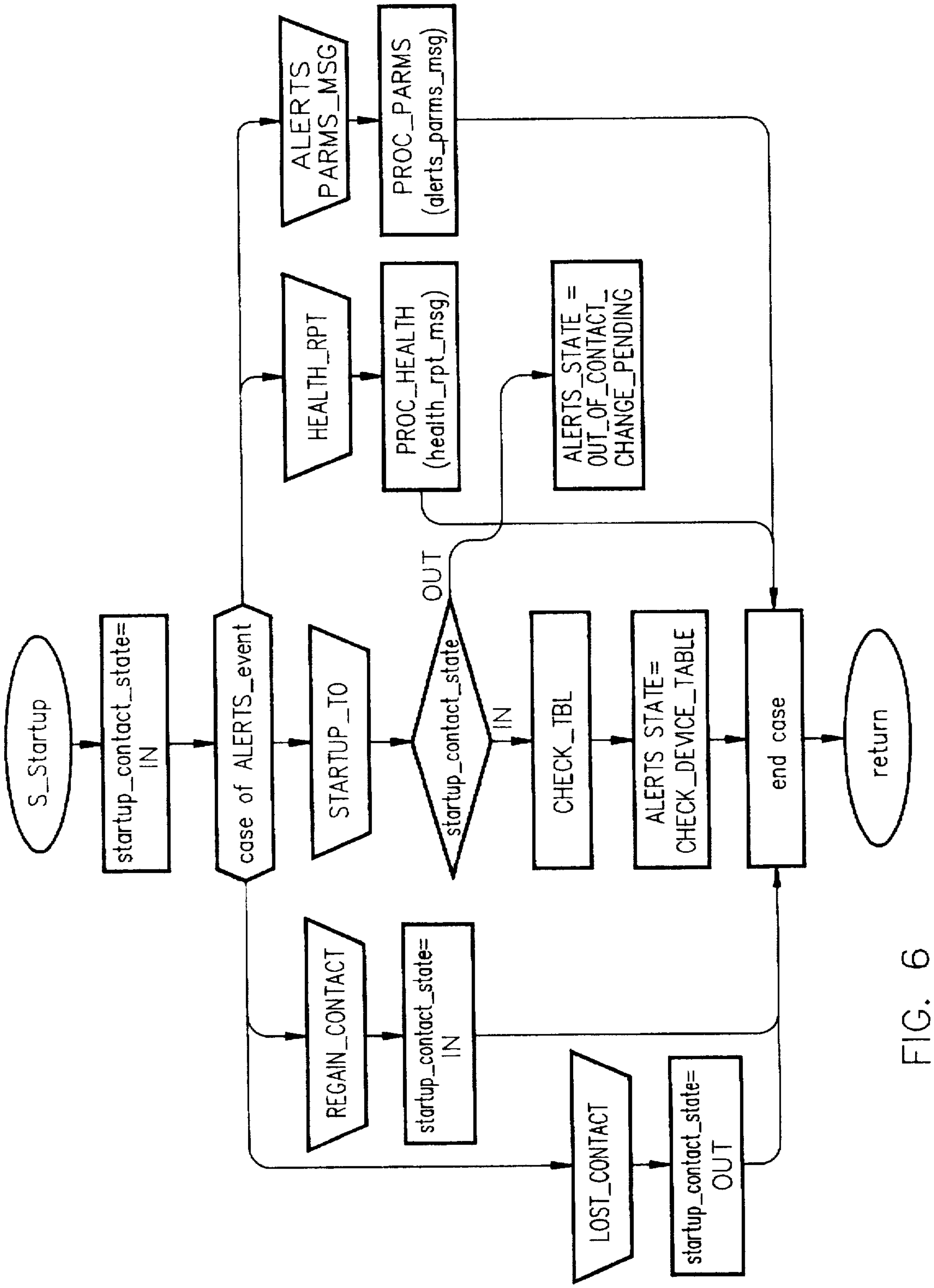

Upon an event occurring (when variable ALERTS_EVENT is assigned a new value), the value of variable ALERTS_STATE is checked and then depending on the value of the variable ALERTS_STATE, the main program calls a particular procedure. As discussed previously, the variable ALERTS_STATE is initially set to the value STARTUP. Therefore, the Startup procedure, shown in FIG. 6, is called.

Figure 15:
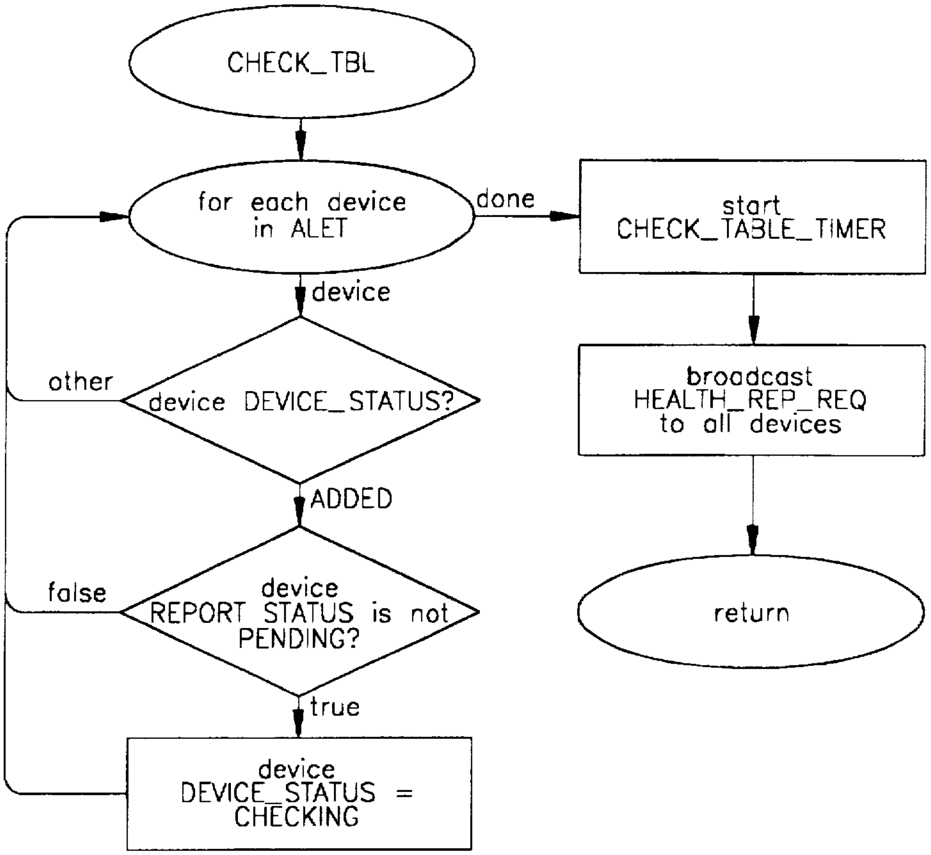

Procedure S_STARTUP begins by assigning variable STARTUP_CONTACT_STATE the value of IN and then determining the case of the variable ALERTS_EVENT. Of course, in the initial pass-through the S_STARTUP procedure, the variable ALERTS_EVENT is equal to the value STARTUP_TO. As the variable STARTUP_CONTACT_STATE has already been set to the value IN, procedure S_STARTUP then calls procedure CHECK_TBL, the flowchart for which is shown in FIG. 15.

Throughout this description it may be helpful to note that those procedures which begin "S_", such as S_STARTUP, are state-dependent procedures, which in this context means the the value of variable ALERTS_STATE determines which procedure is called. As will be explained further in the following disclosure, there are eight (8) possible values for variable ALERTS_STATE, and therefore there are eight (8) state-dependent procedures.

In the locomotive equipment reporting and tracking system 10 of the present invention, the equipment identification information storage database of locomotive equipment is referred to as the active locomotive equipment table (ALET) which is built and maintained dynamically. Procedure CHECK_TBL checks to make sure that the report status of each device is not pending and then broadcasts a Query for Health Report (shown by the variable HEALTH_RPT_REQ) over the local communications network to all devices. On returning from the procedure CHECK_TBL to procedure S_STARTUP, variable ALERTS_STATE is assigned a new value of CHECK_DEVICE_TABLE. The program then leaves procedure S_STARTUP and returns to the general ALERTS procedure call section (ALERTS_FSM) shown in FIGS. 5*a* and 5*b*.

Following the return to the main program, the variable ALERTS_STATE has been set to CHECK_DEVICE_TABLE and then the program waits for the next value to be assigned to variable ALERTS_EVENT from the queue. In general, the ALERTS_EVENT queue is assigned values received from layers of protocol in the MCP 12. These protocol layers recognize additions or deletions from the on-board network of equipment and assign a value to the particular event which has occurred. The following table illustrates each of the possible values which may be assigned to variable ALERTS_EVENT:

TABLE 1

| Value | Definition |
|---|---|
| CHK_TBL_TO | Check Device Table Timeout |
| STARTUP_TO | Startup Timeout |
| CHANGE_TO | Device Change Timeout |
| RESEND_TO | Resend Timer Expired |
| PERIODIC_TO | Periodic Report Timer Expired |

TABLE 1-continued

| Value | Definition |
|---|---|
| HEALTH_RPT | Health Report Processed Report Needed |
| DELIV_OK | ALERTS Report Was Delivered Okay |
| DELIV_BAD | ALERTS Report Not Successfully Delivered |
| LOST_CONTACT | MCP Lost Ground Contact or Exited Coverage |
| REG_CONTACT | MCP Regained Ground Contact or Entered Coverage |
| PORT_UP | Client Port HDLC Link Is Now UP |
| PORT_DOWN | Client Port HDLC Link Is Down |
| CUENT_CHNG | Client Change Due to XID |
| REPORT_REQ | ALERTS Table List Request |
| ALERTS_PARMS | ALERTS Equipment Reporting Parameters Message |

It is important to understand that ALERTS is an event-driven, finite state application, which should be understood to mean that ALERTS is generally inactive until an event occurs within the network. Of course, ALERTS may also receive an event notification from the dispatcher 32 or other person within the ground network, or may be activated by the lapsing of a particular timer, as occurs when the application returns from procedure S_STARTUP as discussed previously.

The physical change which signals the addition or deletion of an intelligent device from the local communications network occurs when an HDLC link is respectively established or broken. An HDLC link is the communications link between the intelligent device and the MCP. It is the PORT_UP, PORT_DOWN and CLIENT_CHNG values of variable ALERTS_EVENT which signal addition or deletion of intelligent devices.

Figure 5A:
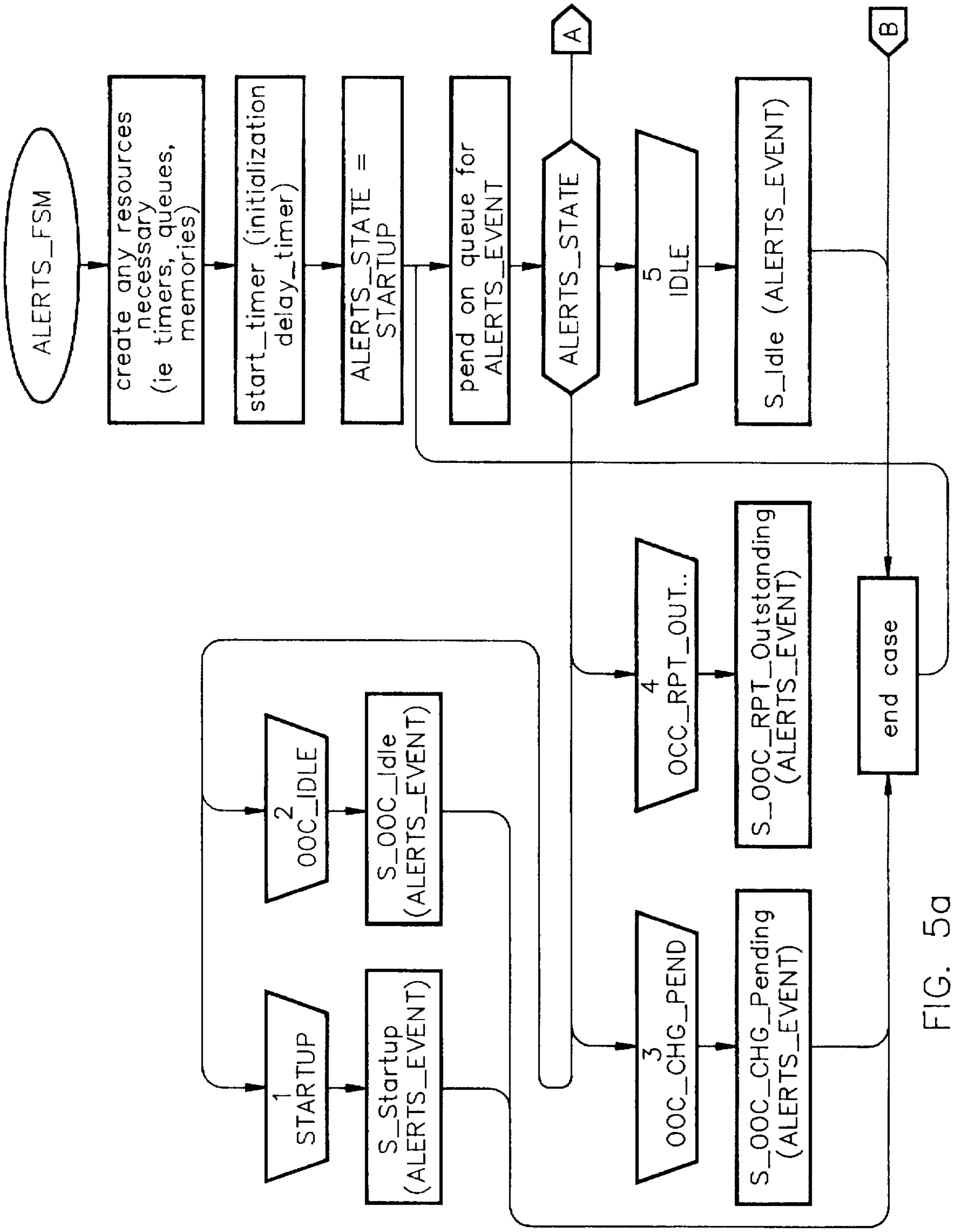
FIGS. 5*a*–24 are flowcharts which represent the various routines and subroutines of the present invention.
Figure 5B:
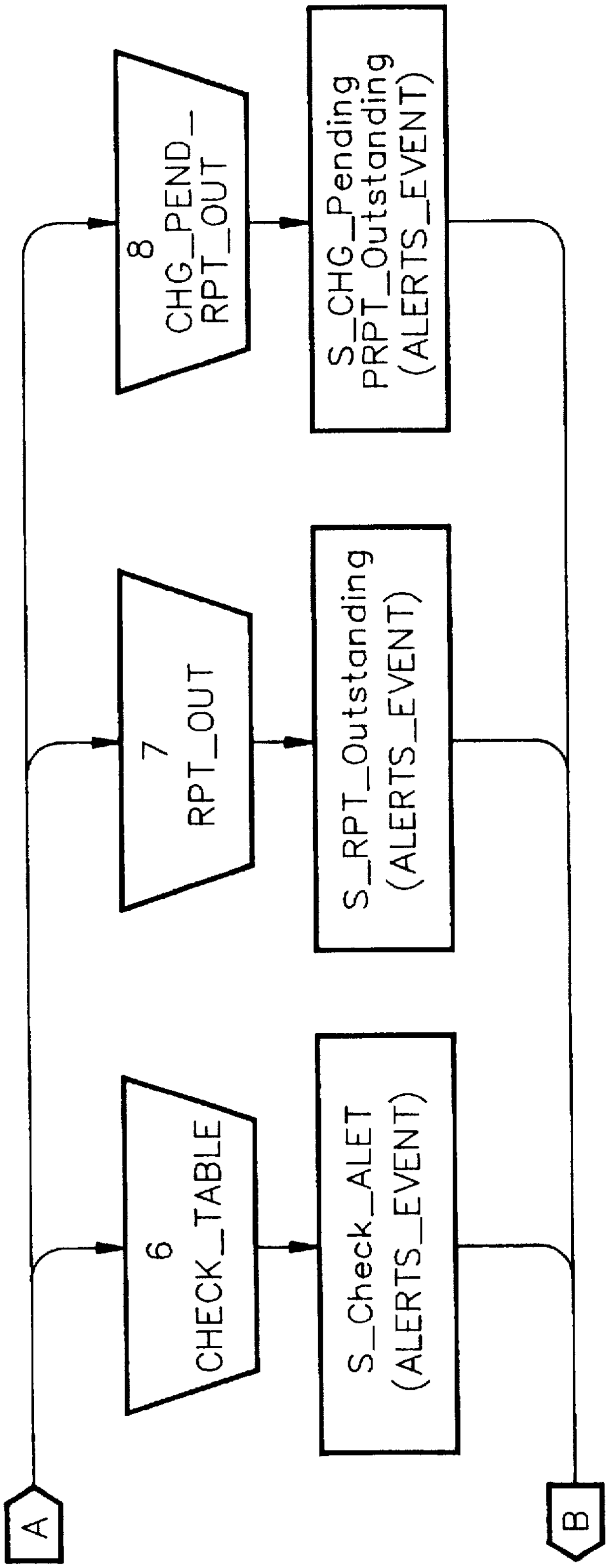

Following the return from procedure S_STARTUP, timer CHECK_TABLE_TIMER continues to run for the configurable 150 seconds, during which time Health Report Messages are received from all equipment operatively connected to the mobile communications package 12. For each Health Report received by the ALERTS 10, variable ALERTS_EVENTS is set to the value HEALTH_RPT, which triggers the application to proceed to a determination of the value of variable ALERTS_STATE. As variable ALERTS_STATE was set to the value of CHECK_TBL, subroutine S_CHECK_ALET is called, as shown in FIG. 5*a*.

Figure 11A:
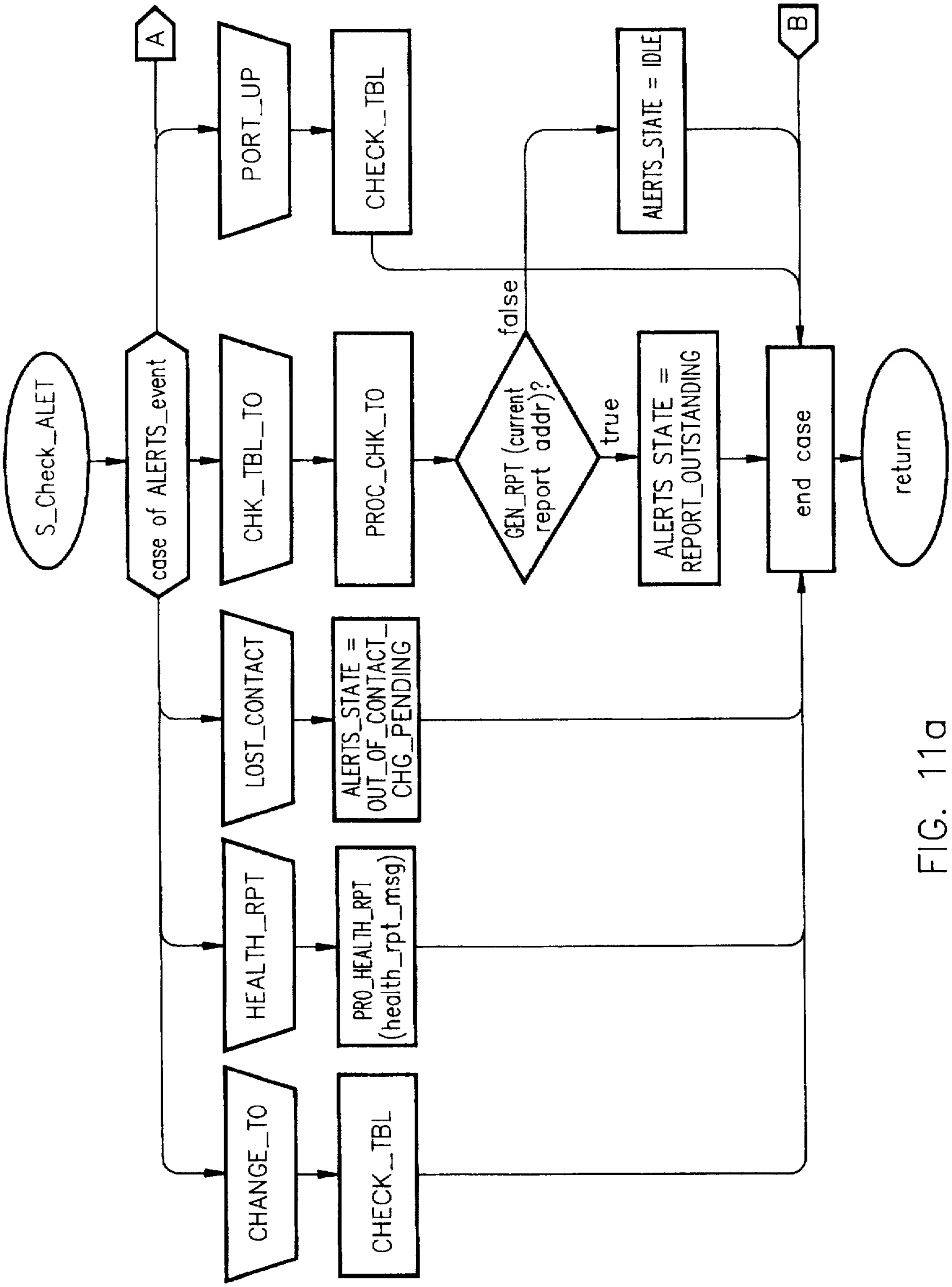

Subroutine S_CHECK_ALET is best shown in FIGS. 11*a* and 11*d*. It is seen that when the case of variable ALERTS_EVENT is equal to HEALTH_RPT, the subroutine S_CHECK_ALET then calls subroutine PROC_HEALTH, shown in FIG. 14.

Subroutine PROC_HEALTH is designed to perform four major functions. First, the subroutine checks to see if the version of the Health Report received from the device is Version Three. If it is not, the available information is mapped to a Version Three report structure. In the preferred embodiment, the term "Version Three" refers to the latest version of the ATCS communications standard, and the ALERTS application is designed to read Health Reports which conform to the latest ATCS standards. The device reported in the Health Report is then compared to devices already in the Active Locomotive Equipment Table (ALET). If it is not already in the table, the three main determination variables are set to the following values: variable DEVICE_STATUS is set to the value ADDED, variable REPORT_STATUS is set to the value NOT_REPORTED and variable RETURN_CODE is set to the value TRUE. The application then exits procedure PROC_HEALTH.

If, on the other hand, the device is already in the Active Locomotive Equipment Table, the status of variable DEVICE_STATUS is checked. If variable DEVICE_STATUS does not equal the value DELETED, the variable DEVICE_STATUS is set to the value ADDED. Then, if variable REPORT_STATUS equals NOT_REPORTED, variable RETURN_CODE is set to the value TRUE, otherwise variable RETURN_CODE is set to the value FALSE and the application exits procedure PROC_HEALTH.

If variable DEVICE_STATUS does equal the value DELETED, procedure PROC_HEALTH then determines the value of variable REPORT_STATUS for the particular device. If the value of variable REPORT_STATUS is equal to the value NOT_REPORTED, variable DEVICE_STATUS is set to the value ADDED, variable REPORT_STATUS is set to the value REPORTED and variable RETURN_CODE is set to the value FALSE. If the value of variable REPORT_STATUS is equal to the value REPORTED, variable DEVICE_STATUS is set to the value ADDED, variable REPORT_STATUS is set to the value NOT_REPORTED and variable RETURN_CODE is set to the value TRUE. Finally, if the value of variable REPORT_STATUS is equal to the value PENDING, the device change timer (START_CHG_TMR) is started and the variable RETURN_CODE is set to the value FALSE. The application then exits procedure PROC_HEALTH.

It is important to note that each of the variables DEVICE_STATUS and REPORT_STATUS are preferably array-type variables. In other words, each device in the Active Locomotive Equipment Table would have individual values for the variables DEVICE_STATUS and REPORT_STATUS.

In the initial pass through procedure PROC_HEALTH, it is clear that as the ALET has no devices in the table, each new device will be added to the table, thus creating an updated table which includes all equipment reporting Health Report Messages in response to the Query for Health Report. This process of initially creating the ALET continues until the Check Table Timer expires.

Figure 11B:
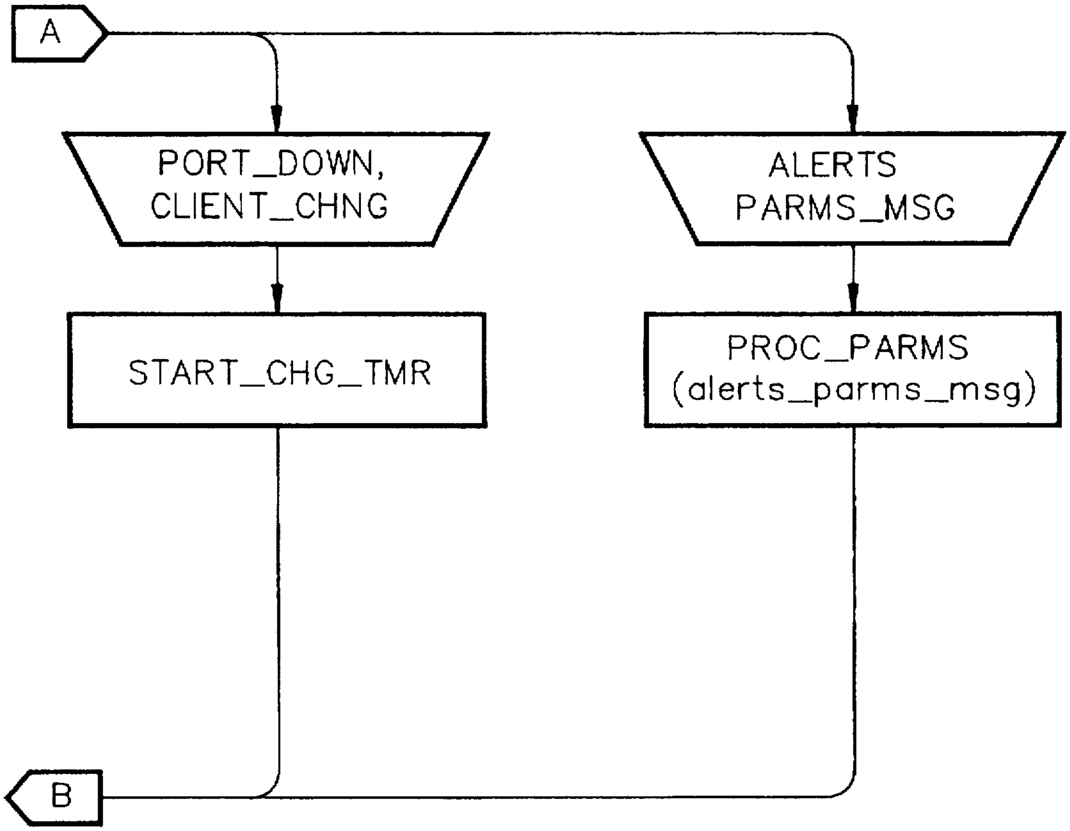

When CHECK_TABLE_TIMER expires, variable ALERTS_EVENT is assigned the value CHK_TBL_TO, and as variable ALERTS_STATE is already set to the value CHECK_TABLE, procedure S_CHECK_ALET is again called, as shown in FIGS. 11*a* and 11*b*. As the case of variable ALERTS_EVENT is equal to the value CHK_TBL_TO, procedure PROC_CHK_TO is called.

Figure 24:
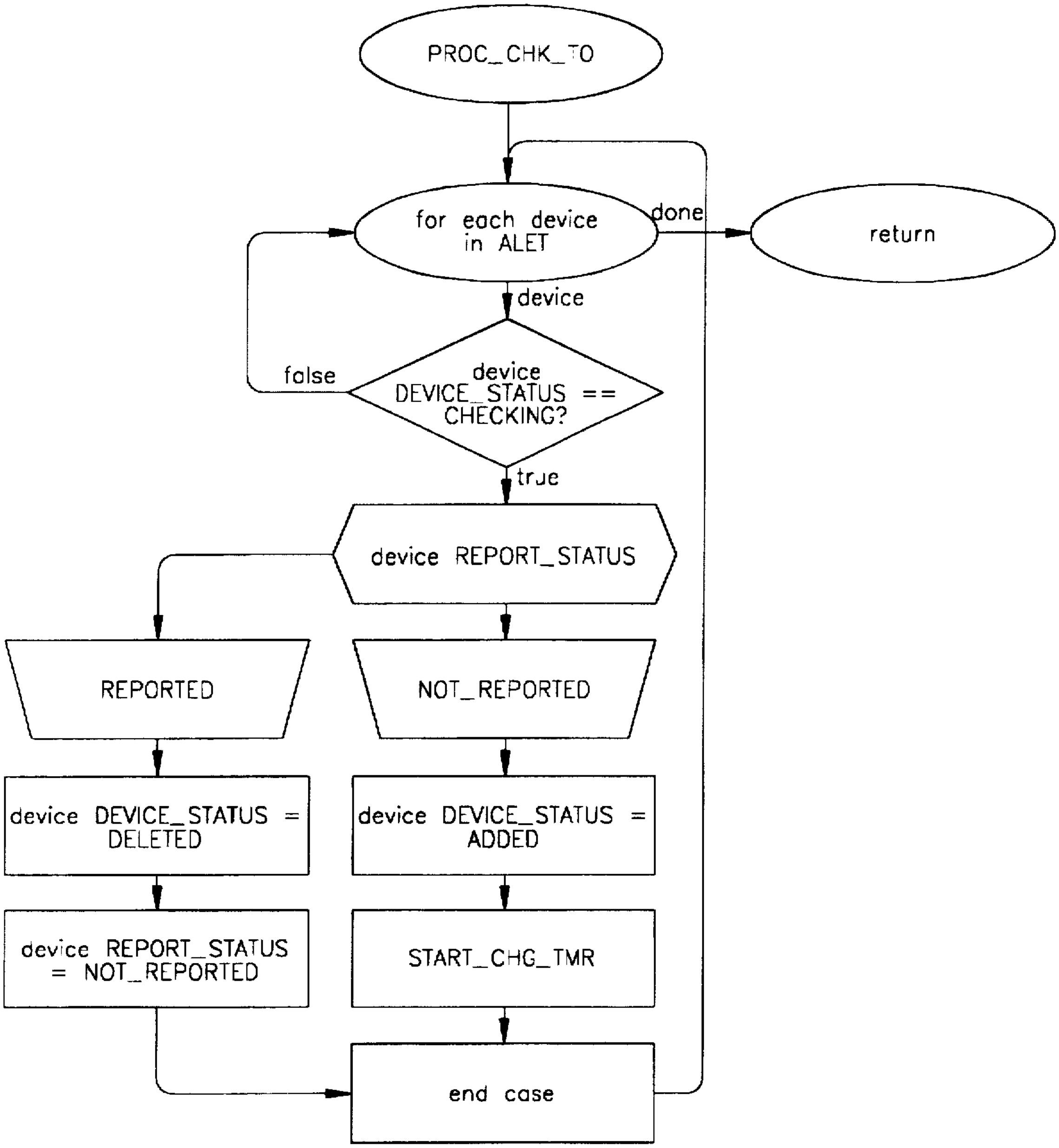

Procedure PROC_CHK_TO is shown in FIG. 24. In the subroutine, each device in the ALET is checked to see if the variable DEVICE_STATUS is equal to the value CHECKING. If it is not, the value of the variable DEVICE_STATUS for the next device in the table is checked. If, however, variable DEVICE_STATUS is equal to the value CHECKING, the procedure determines the value of variable REPORT_STATUS for the device. If the value of variable REPORT_STATUS equals the value REPORTED, variable DEVICE_STATUS is set to the value DELETED and variable REPORT_STATUS is set to the value NOT_REPORTED. If, on the other hand, the value of variable REPORT_STATUS equals the value NOT_REPORTED, variable DEVICE_STATUS is set to the value ADDED and procedure START_CHG_TMR is called.

Figure 21:
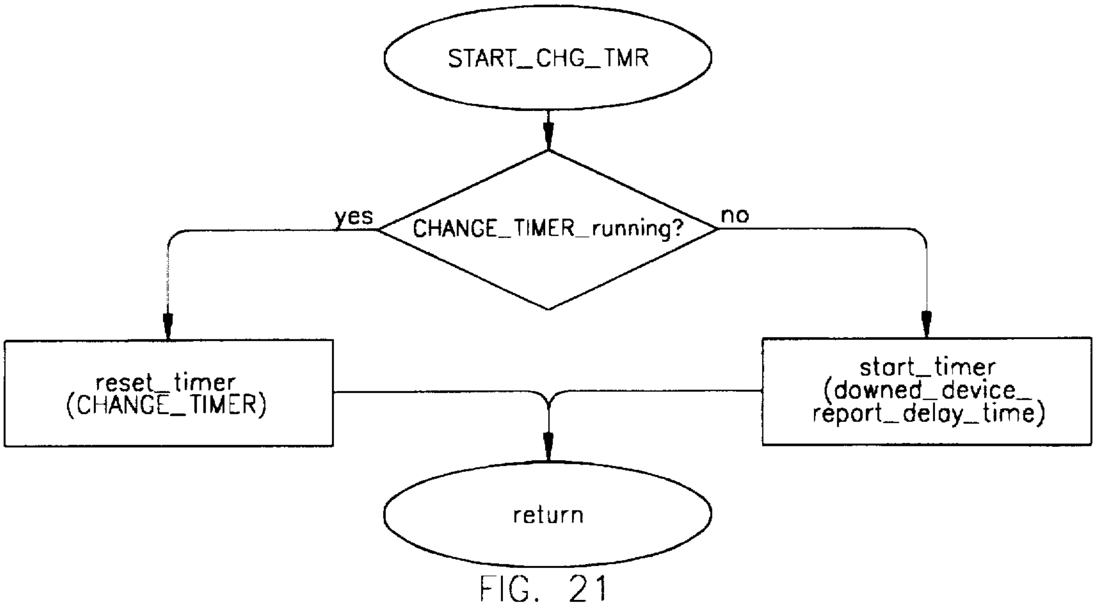

Procedure START_CHG_TMR is shown best in FIG. 21 as determining whether the CHANGE_TIMER is running. If the timer is running, the CHANGE_TIMER is reset. On the other hand, if the CHANGE_TIMER is not running, the timer is started. It is important to note that timer CHANGE_TIMER starts to run when a device that was previously reported as active in the table does not respond with a Health Report Message to the ALERTS application. This allows the downed device a configurable recovery time, which is preferably 120 seconds, and thus prevents reporting downed devices when they are merely going through reset. The ALERTS application will wait the configurable amount of time before reporting a device as downed to the front end processor 46. Following the return of the application from procedure START_CHG_TMR to procedure PROC_CHK_TO, the application then returns to procedure S_CHECK_ALET, as shown in FIG. 11*a*.

Figure 16:
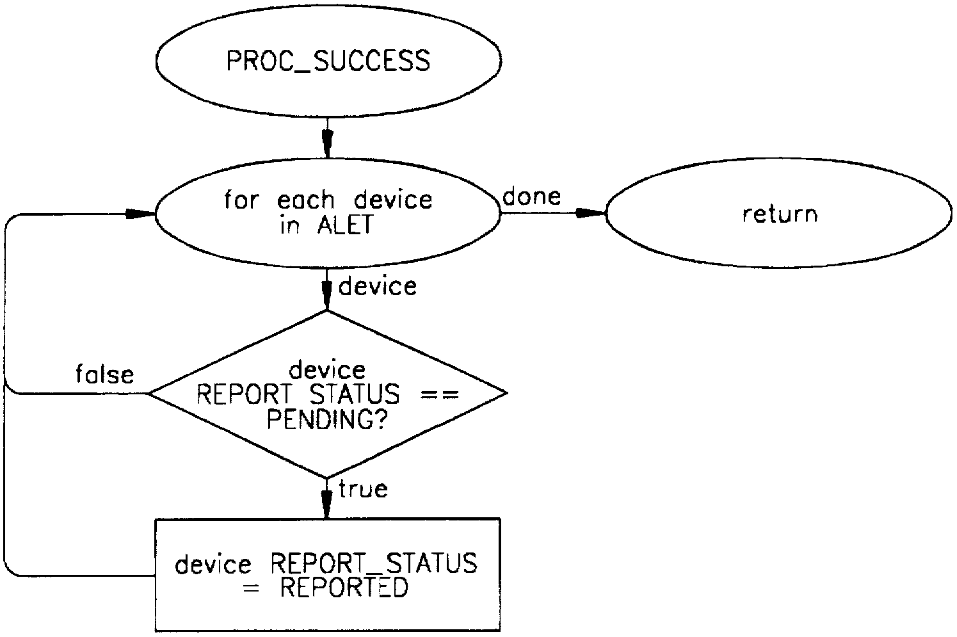

Procedure S_CHECK_ALET then checks to determine if a report should be generated by calling procedure GEN_RPT, shown in FIG. 16. Procedure GEN_RPT is basically a counting procedure which determines the number of devices added or deleted from the ALET. Clearly, the first time procedure GEN_RPT is called, each device in the ALET will have been added, and therefore the variable DEVICES_CHANGED will have a value greater than 1. When the value of variable DEVICES_CHANGED is greater than 1, procedure GEN_RPT calls procedure GEN_TBL_RPT and assigns variable RETURN_CODE the value TRUE.

Figure 17:
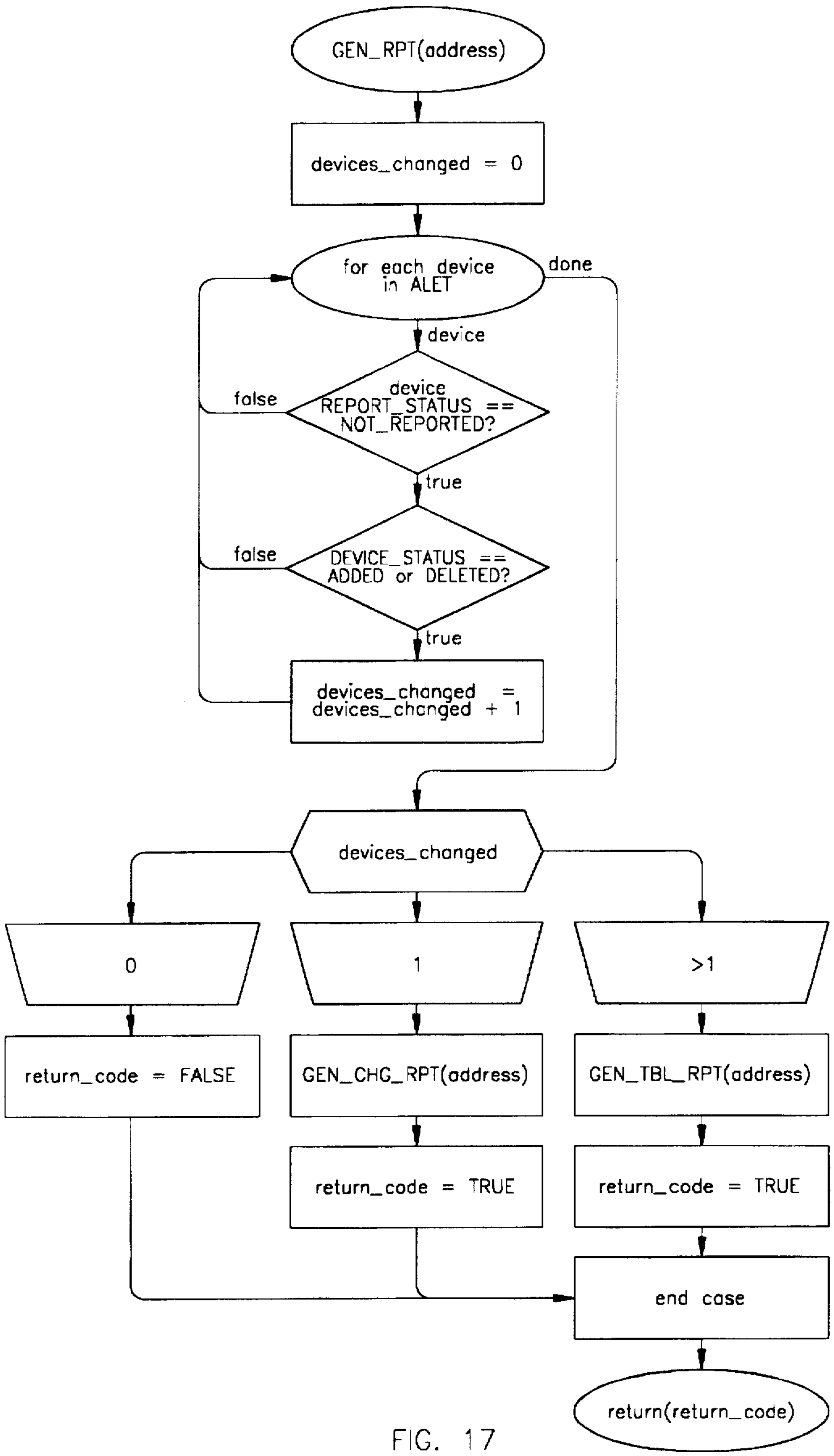

Procedure GEN_TBL_RPT is shown best in FIG. 17 as checking each device in the ALET to see if the variable DEVICE_STATUS for each device is equal to the value ADDED. If it is, the device data from the ALET is assigned to message 98.4.2, which is referred to as the Locomotive Equipment List Report. If the value of the variable DEVICE_STATUS is not equal to the value ADDED, the next device in the ALET is checked. Once the device data is assigned to the message, the value of variable DEVICE_STATUS for the device is checked to see if the value is not equal to the value REPORTED. If the value of the variable DEVICE_STATUS is not equal to the value REPORTED, the value of the variable DEVICE_STATUS is set to the value PENDING. If, however, the device has been reported, the procedure goes on to check the next device in the ALET. After all devices are checked, the Locomotive Equipment List Report (message 98.4.2) is queued to be sent to a preconfigured network address, the location of which may be changed should such change be desired. Procedure GEN_TBL_RPT then returns to procedure S_CHECK_ALET, and variable ALERTS_STATE is set to the value REPORT_OUTSTANDING. Procedure S_CHECK_ALET then returns to procedure ALERTS_FSM.

Upon returning to procedure ALERTS_FSM, the application pends on the queue which assigns values to variable ALERTS_EVENT thus waiting for the next value to be assigned to variable ALERTS_EVENT.

The application has now sent the Locomotive Equipment Table to the front-end processor 46 through the radio frequency connection between the MCP 12 and base stations 52 and 54, and from the base stations 52 and 54 through the ground network to the front-end processor 46. The ALERTS application in the front-end processor then maintains the database of locomotive equipment for each locomotive in the network. It is preferred that the following specific information be maintained on each equipment item: manufacturer, serial number, hardware version, software/firmware version, manufacturer's equipment code, ATCS equipment code, time and date equipment was last known to be active on locomotive, locomotive ID, the base station which last heard the mobile with this equipment active and the SSI from that base station, time and date equipment first became active on the particular locomotive, the time and date equipment status was changed and finally the current ALERTS equipment status. Discussion of the implementation of the ALERTS application in the front-end processor 46 will be undertaken below.

Returning to the ALERTS application in the MCP 12, we find that the further functioning of the application is best described in terms of the occurrence of a particular event and the variable ALERTS_STATE being in a particular stated value. There are only 15 finite events which may occur within the ALERTS application, which were set forth previously. Similarly, in the preferred embodiment, the ALERTS application includes only 8 possible states for the variable ALERTS_STATE, which are set forth below in Table 2:

TABLE 2

| Variable Value | Procedure Called |
|---|---|
| STARTUP | Startup |
| OOC_IDLE | Out of Contact, Idle |
| OOC_CHG_PEND | Out of Contact, Change Pending |
| OOC_RPT_OUTSTANDING | Out of Contact, Report Outstanding, Idle |
| S_IDLE | Idle |
| CHECK_TABLE | Check ALET |
| RPT_OUT | Report Outstanding |
| CHG_PEND_RPT_OUT | Report Outstanding, Change Pending |

When a particular state procedure is called from ALERTS_FSM, various functional procedures are then called, some of which have already been explained previously. However, it is preferred that a limited number of functional procedures be available for call from the state procedures, the functional procedures being selected from the list shown in Table 3:

TABLE 3

| Functional Procedure | Procedure Function |
|---|---|
| CHECK_TBL | Verify All Devices in Table |
| PROC_PARMS | Process a Reconfiguration Message |
| PROC_HEALTH | Process a Received Health Report |
| PROC_FAIL | Delivery of a Device Report Failed |
| PROC_SUCCESS | Process Successful Delivery of Report |
| GEN_RPT | Generate Report to Specified Address |
| GEN_ThL_RPT | Generate Table Report to Specified Address |
| GEN_CHG_RPT | Generate Device Change Report to Address |
| START_CHG_TMR | Start (Restart) Device Changed Timer |
| START_RS_TMR | Start the Reset Timer |
| REBUILD_TABLE | Cause Rebuild of Device Table |
| PROC_CHK_TO | Process ALET After Delay for Health Reports |

The following descriptions of the various procedures in the ALERTS are provided to clarify and elaborate on the flowcharts shown in FIGS. 6a–24. As has been stated, each of the various procedures will be called in response to a particular event occurring when the ALERTS application is in a particular state.

FIG. 6 shows procedure S_STARTUP which is called when variable ALERTS_STATE is equal to the value STARTUP. Procedure S_STARTUP first assigns variable STARTUP_CONTACT_STATE the value of IN and then checks to see what the case of variable ALERTS_EVENT is equal to. If variable ALERTS_EVENT has a value LOST_CONTACT, variable STARTUP_CONTACT_STATE is set to the value OUT and procedure S_STARTUP is exited. If variable ALERTS_EVENT has a value REG_CONTACT, variable STARTUP_CONTACT_STATE is set to the value IN and procedure S_STARTUP is exited. In the case where variable ALERTS_EVENT is equal to the value STARTUP_TO, procedure S_STARTUP performs the routine described previously in connection with start-up of the ALERTS application. When variable ALERTS_EVENT is equal to the value HEALTH_RPT, procedure PROC_HEALTH is called, the procedure being described previously in this disclosure. Finally, when variable ALERTS_EVENT is equal to the value ALERT_PARMS_MSG, procedure PROC_PARMS is called, following the return from which procedure S_STARTUP is exited. Procedure PROC_PARMS will be discussed further later in this specification.

Figure 7:
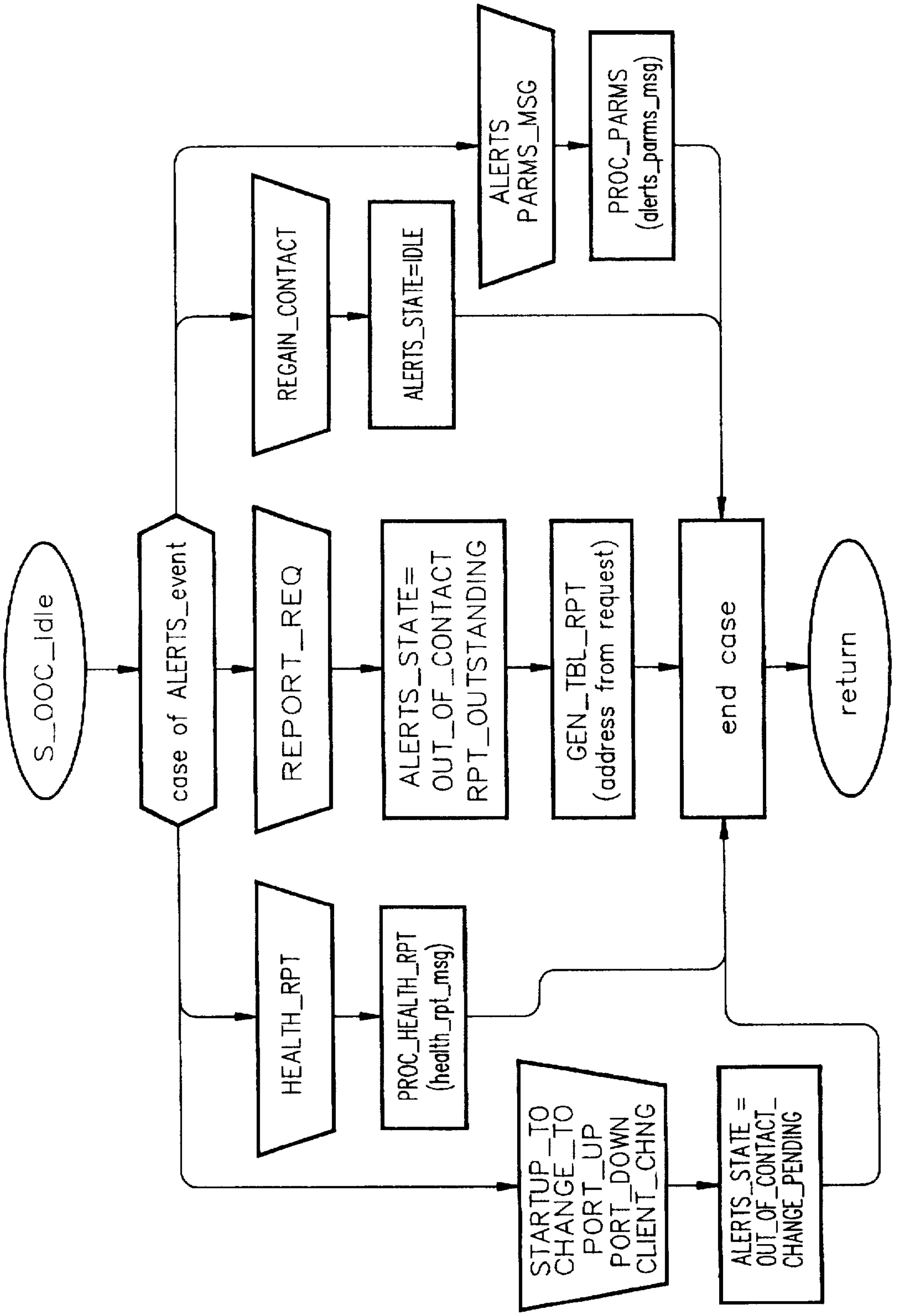

FIG. 7 discloses procedure S_OOC_IDLE, which is called when variable ALERTS_STATE is equal to the value S_OOC_IDLE. Variable ALERTS_STATE can be set to the value S_OOC_IDLE in procedure S_OOC_RPT_OUTSTANDING and in procedure S_IDLE, as will be discussed below. In procedure S_OOC_IDLE, the case of variable ALERTS_EVENT is determined as a first step. If the value of variable ALERTS_EVENT is equal to STARTUP_TO, CHANGE_TO, CLIENT_CHNG, PORT_UP or PORT_DOWN, variable ALERTS_STATE is set to the value OUT_OF_CONTACT_CHANGE_PENDING and the application then exits procedure S_OOC_IDLE. If variable ALERTS_EVENT is equal to the value HEALTH_RPT, procedure PROC_HEALTH is called, and the incoming health report is processed as was previously discussed. Procedure S_OOC_IDLE is then exited. When the case of variable ALERTS_EVENT is equal to the value REPORT_REQ, as would happen when a report is requested from the front-end processor 46, variable ALERTS_STATE is set to the value OUT_OF_CONTACT_RPT_OUTSTANDING and procedure GEN_TBL_RPT is called which generates a table report, the procedure shown in FIG. 19. Procedure S_OOC_IDLE is then exited. If the value of variable ALERTS_EVENT is equal to the value REG_CONTACT, variable ALERTS_STATE is set to the value IDLE, and if the value of variable ALERTS_EVENT is equal to the value ALERTS_PARMS_MSG, procedure PROC_PARMS is called. Procedure S_OOC_IDLE is then exited.

Figure 8:
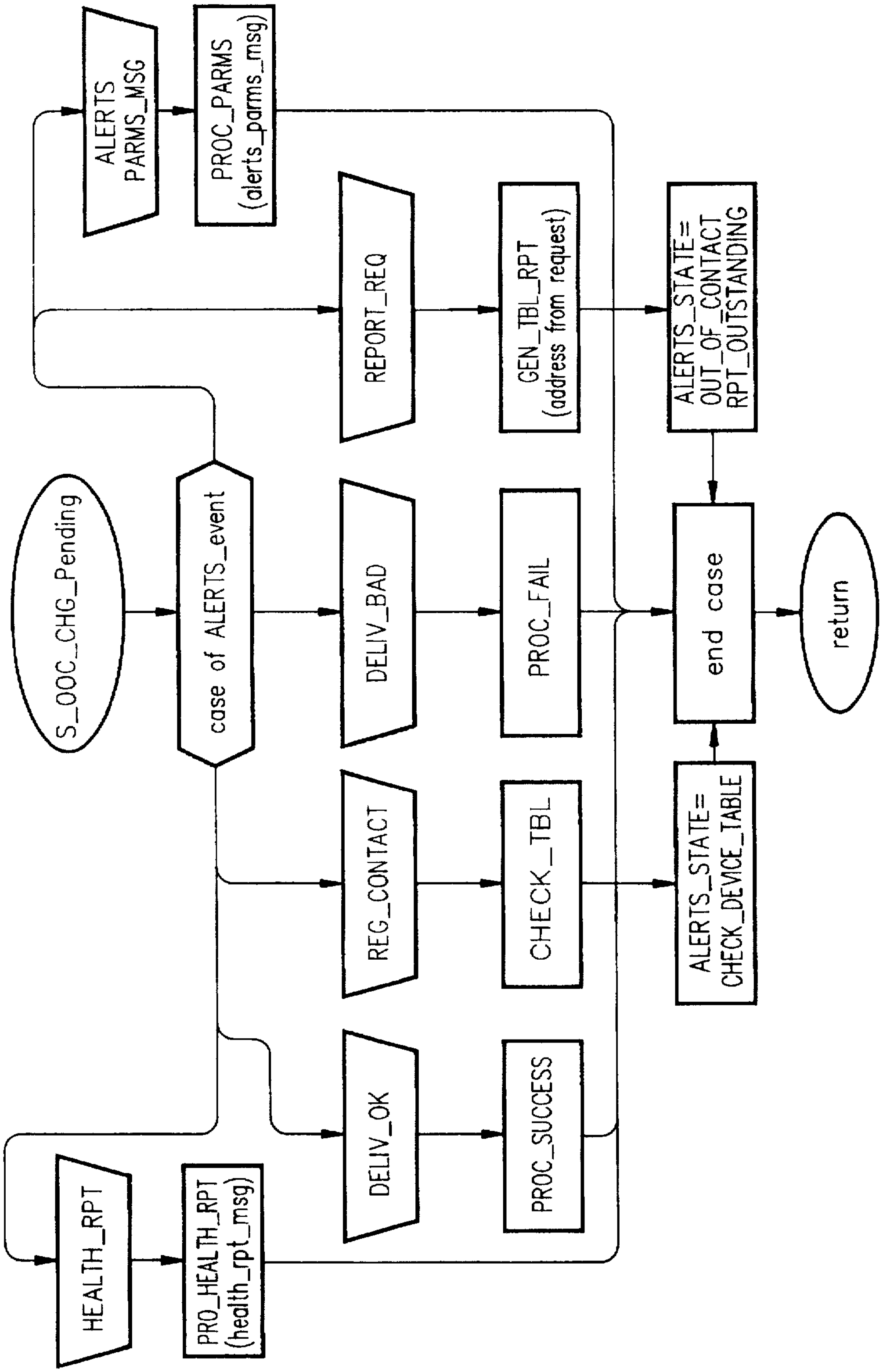
Figure 18:
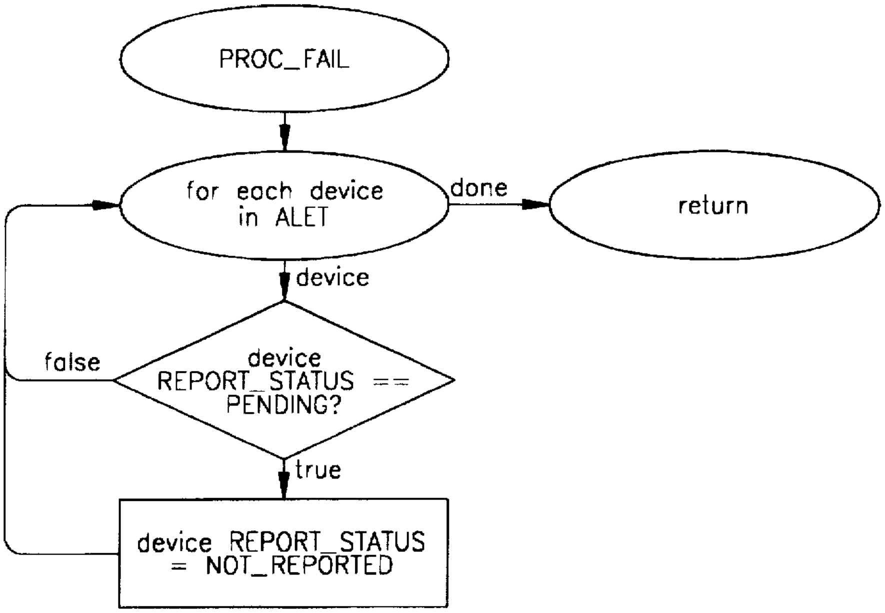

Procedure S_OOC_CHG_PENDING is shown best in FIG. 8, and involves first checking the case of variable ALERTS_EVENT. If the value of variable ALERTS_EVENT is equal to the value HEALTH_RPT, procedure PROC_HEALTH_RPT is called to process the incoming health report. If the value of variable ALERTS_EVENT is equal to the value DELIV_OK, procedure PROC_SUCCESS is called, which is shown best in FIG. 16. Procedure S_OOC_CHG_PENDING is then exited. If variable ALERTS_EVENT is equal to the value REG_CONTACT, procedure CHECK_TBL is called, and functions in the way described previously in connection with start-up of the application. Variable ALERTS_STATE is then set to the value CHECK_DEVICE_TABLE and procedure S_OOC_CHG_PENDING is exited. If variable ALERTS_EVENT is equal to the value DELIV_BAD, procedure PROC_FAIL, shown best in FIG. 18, is called, following which procedure S_OOC_CHG_PENDING is exited. If variable ALERTS_EVENT is equal to the value REPORT_REQ, procedure GEN_TBL_RPT is called and variable ALERTS_STATE is set to the value OUT_OF_CONTACT_RPT_OUTSTANDING. Procedure S_OOC_CHG_PENDING is then exited. Finally, if variable ALERTS_EVENT is equal to the value ALERTS_PARMS_MSG, procedure PROC_PARMS is called. The application then exits procedure S_OOC_CHG_PENDING and returns to procedure ALERTS_FSM.

Figure 9:
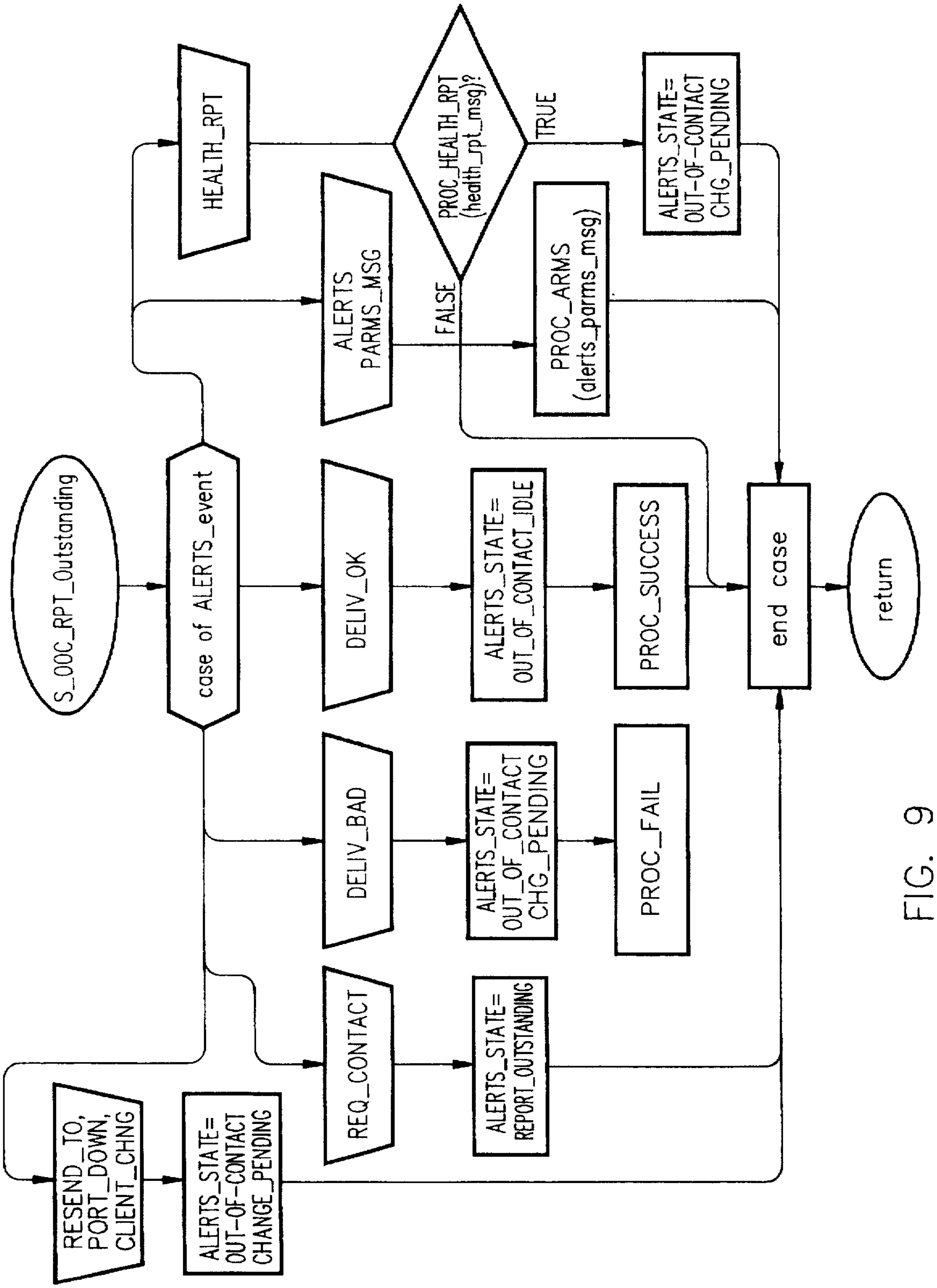

FIG. 9 shows procedure S_OOC_RPT_OUTSTANDING as including the step of determining the case of variable ALERTS_EVENT. If variable ALERTS_EVENT has a value equal to RESEND_TO, PORT_DOWN or CLIENT_CHNG, variable ALERTS_STATE is set to the value OUT_OF_CONTACT_CHANGE_PENDING and the procedure is exited. If variable ALERTS_EVENT is equal to the value REQ_CONTACT, variable ALERTS_STATE is set to the value REPORT_OUTSTANDING and the application exits the procedure. If variable ALERTS_EVENT is equal to the value DELIV_BAD, variable ALERTS_STATE is set to the value OUT_OF_CONTACT_CHANGE_PENDING and procedure PROC_FAIL is called. Following the return of the application from procedure PROC_FAIL, procedure S_OOC_RPT_OUTSTANDING is exited. In the case where variable ALERTS_EVENT is equal to the value DELIV_OK, variable ALERTS_STATE is set to the value OUT_OF_CONTACT_IDLE and procedure PROC_SUCCESS is called. Upon returning from procedure PROC_SUCCESS, procedure S_OOC_RPT_OUTSTANDING is exited. If variable ALERTS_EVENT is equal to the value ALERTS_PARMS_MSG, procedure PROC_PARMS is called and upon returning from that procedure, procedure S_OOC_RPT_OUTSTANDING is exited. Finally, when variable ALERTS_EVENT is equal to the value HEALTH_RPT, procedure PROC_HEALTH is called and based on the value of variable RETURN_CODE upon returning from procedure PROC_HEALTH, procedure S_OOC_RPT_OUTSTANDING follows one of two paths. If variable RETURN_CODE is False, the procedure is exited. Otherwise, if variable RETURN_CODE is True, variable ALERTS_STATE is set to the value OUT_OF_CONTACT_CHG_PENDING and procedure S_OOC_RPT_OUTSTANDING is exited. The application then returns to procedure ALERTS_FSM.

Figure 10A:
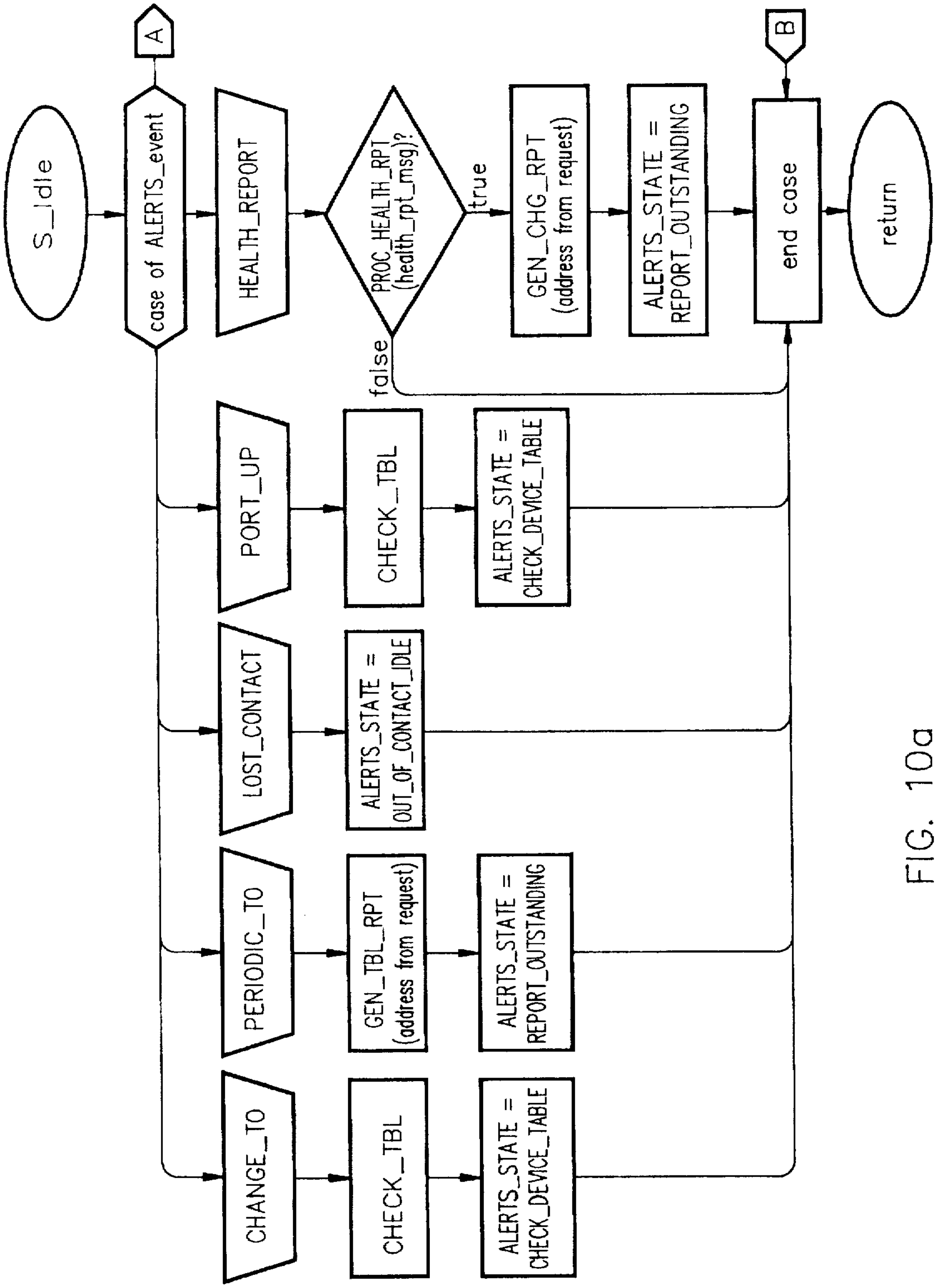
Figure 10B:
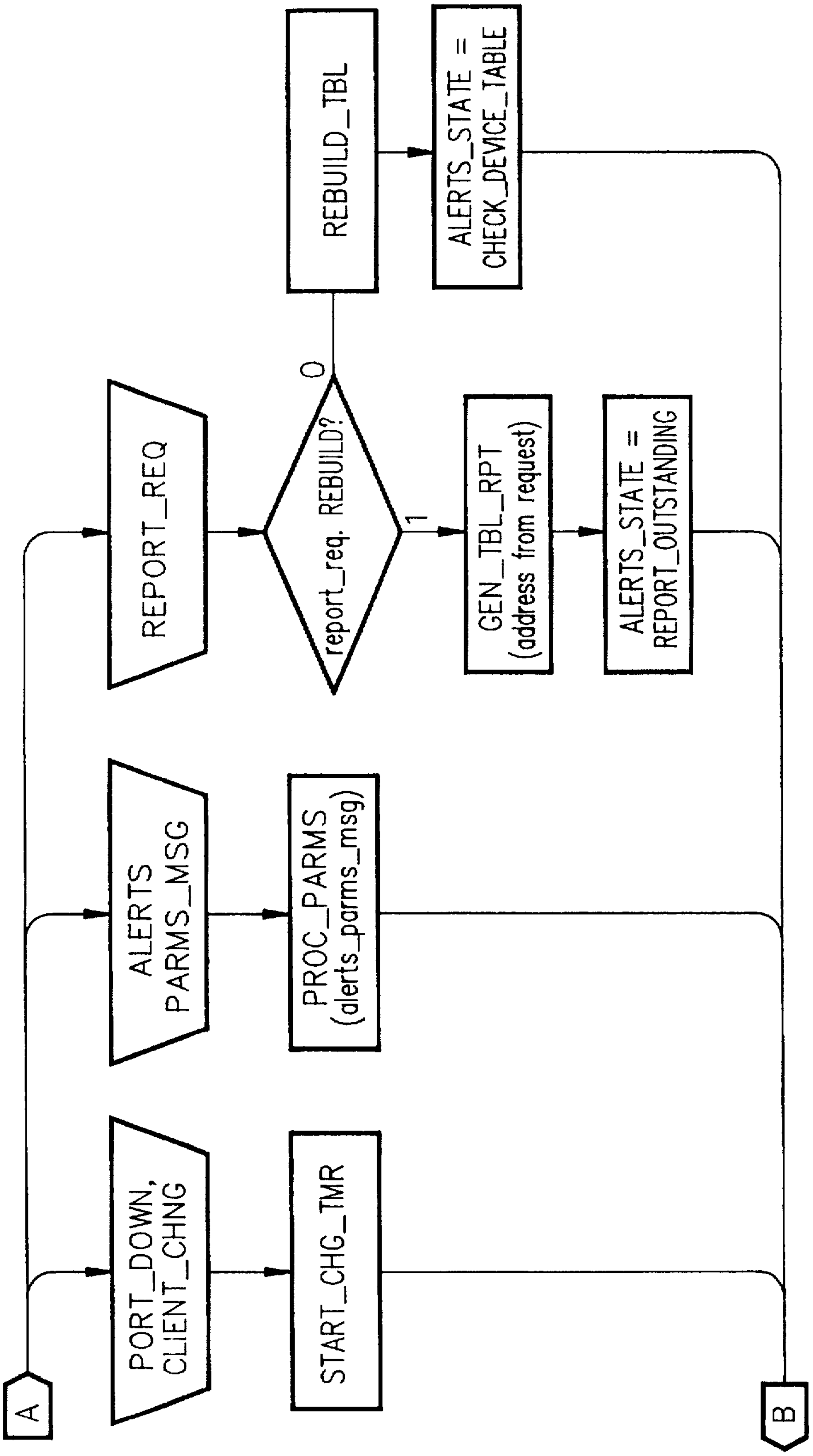

One of the more extensive procedures in the ALERTS application is procedure S_IDLE, shown in FIGS. 10*a* and 10*b*. Again, the case of variable ALERTS_EVENT directs procedure S_IDLE to initiate certain operations, as has been seen in connection with those procedures discussed previously. If variable ALERTS_EVENT has a value of CHANGE_TO, procedure CHECK_TBL is called and upon returning from procedure CHECK_TBL, variable ALERTS_STATE is set to the value CHECK_DEVICE_TABLE. The application then exits procedure S_IDLE. If the value of variable ALERTS_EVENT is equal to the value PERIODIC_TO, procedure GEN_TBL_RPT is called and upon returning from that procedure, variable ALERTS_STATE is set to the value REPORT_OUTSTANDING. When variable ALERTS_EVENT is equal to the value PERIODIC_TO, this means that the periodic report timer has expired, thus causing the ALERTS application to transmit a general table report. The periodic timer is configurable in the preferred embodiment to transmit reports at intervals as small as 15 minutes, although the default setting is to disable the periodic timer.

Returning to procedure S_IDLE, if variable ALERTS_EVENT is equal to the value LOST_CONTACT, variable ALERTS_STATE is set to the value OUT_OF_CONTACT_IDLE and the procedure is exited. When variable ALERTS_EVENT is equal to the value PORT_UP, procedure CHECK-TBL is called and upon returning from that procedure, variable ALERTS_STATE is set to the value CHECK_DEVICE_TABLE. Procedure S_IDLE is then exited. If variable ALERTS_EVENT is equal to the value HEALTH_REPORT, procedure PROC_HEALTH is called and depending on the value returned for the variable RETURN_CODE, procedure S_IDLE follows one of two paths. If variable RETURN_CODE is False, the procedure is exited. If, however, variable RETURN_CODE is True, procedure GEN_CHG_RPT is called and upon returning from that procedure, variable ALERTS_STATE is set to the value REPORT_OUTSTANDING. The procedure S_IDLE is then exited.

Turning to FIG. 10*b*, procedure S_IDLE continues such that when variable ALERTS_EVENT is equal to the value PORT_DOWN or CLIENT_CHNG, procedure START_CHG_TMR is called and upon returning from that procedure, procedure S_IDLE is exited. If variable ALERTS_EVENT is equal to the value ALERTS_PARMS_MSG, procedure PROC_PARMS is called and upon returning from that procedure, procedure S_IDLE is exited. Finally, if variable ALERTS_EVENT is equal to the value REPORT_REQ, the procedure checks to see if the ALET (Active Locomotive Equipment Table) needs to be rebuilt due to changes that have taken place since the last table report. If the table should be rebuilt, procedure REBUILD_TBL is called and upon returning from that procedure, variable ALERTS_STATE is set to the value CHECK_DEVICE_TABLE. If, however, the table does not need to be rebuilt, procedure GEN_TBL_RPT is called and upon returning from that procedure, variable ALERTS_STATE is set to the value REPORT_OUTSTANDING. Procedure S_IDLE is then exited, and the application returns to procedure ALERTS_FSM.

Procedure S_CHECK_ALET is best shown in FIGS. 11*a* and 11*b*, and the procedure begins by checking the case of variable ALERTS_EVENT. If the value of variable ALERTS_EVENT is equal to the value CHANGE_TO, procedure CHECK_TBL and upon returning from that procedure, procedure S_CHECK_ALET is exited. If the value of variable ALERTS_EVENT is equal to the value HEALTH_RPT, procedure PROC_HEALTH is called and upon returning from that procedure, procedure S_CHECK_ALET is exited. When the value of variable ALERTS_EVENT is equal to the value LOST_CONTACT, variable ALERTS_STATE is set to the value OUT_OF_CONTACT_CHG_PENDING. When the value of variable ALERTS_EVENT is equal to the value CHK_TBL_TO, the procedure follows the sequence described previously in connection with start-up of the ALERTS application. If variable ALERTS_EVENT is equal to the value PORT_UP, procedure CHECK_TBL is called and upon returning from that procedure, procedure S_CHECK_ALET is exited.

FIG. 11*b* shows the remaining two branches of procedure S_CHECK_ALET. If variable ALERTS_EVENT is equal to the value PORT_DOWN or CLIENT_CHNG, procedure START_CHG_TMR is called and upon returning from that procedure, procedure S_CHECK_ALET is exited. Finally, if variable ALERTS_EVENT is equal to the value ALERTS_PARMS_MSG, procedure PROC_PARMS is called and upon returning from that procedure, the procedure S_CHECK_ALET is exited. The application then returns to main program ALERTS_FSM.

Figure 12A:
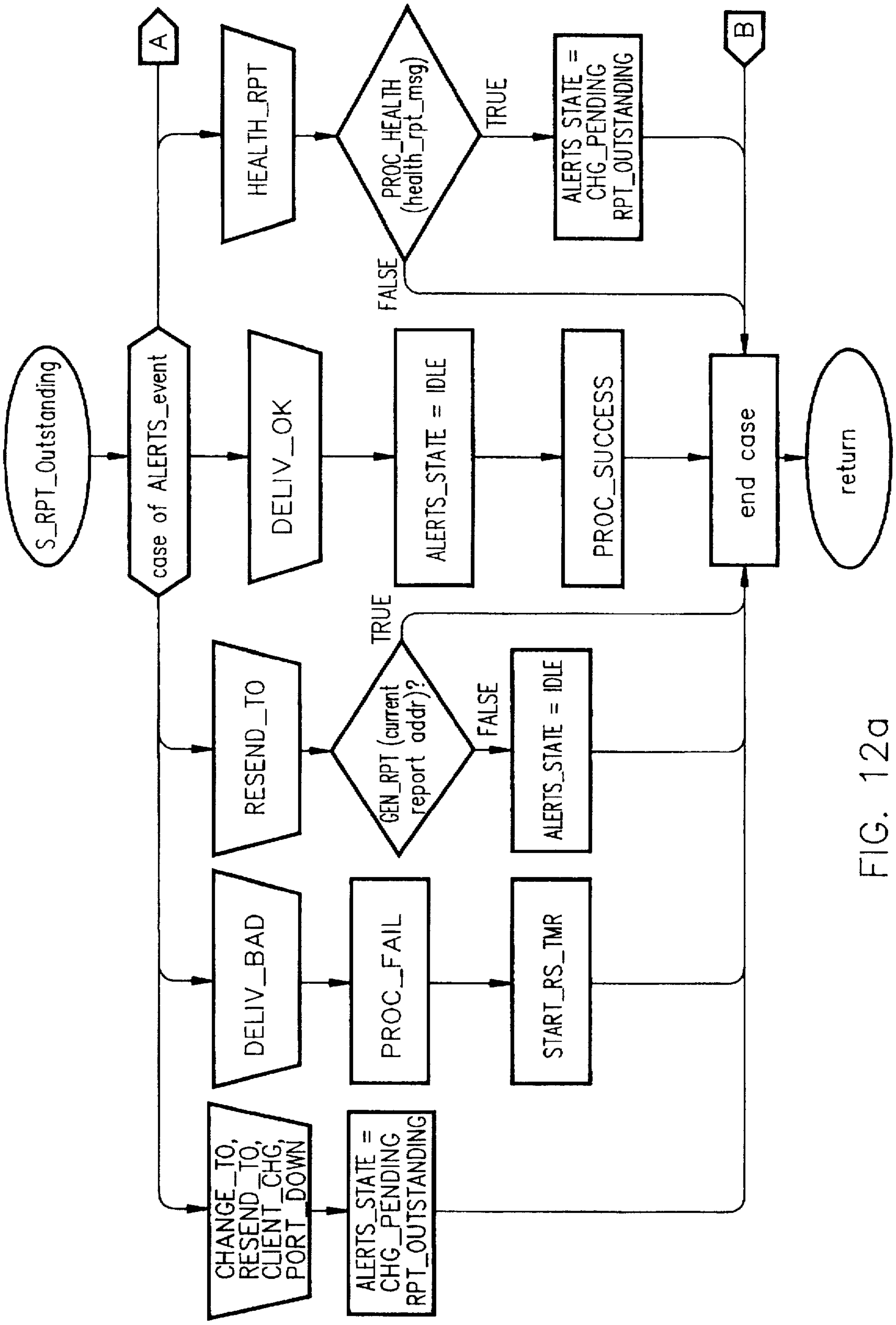
Figure 12B:
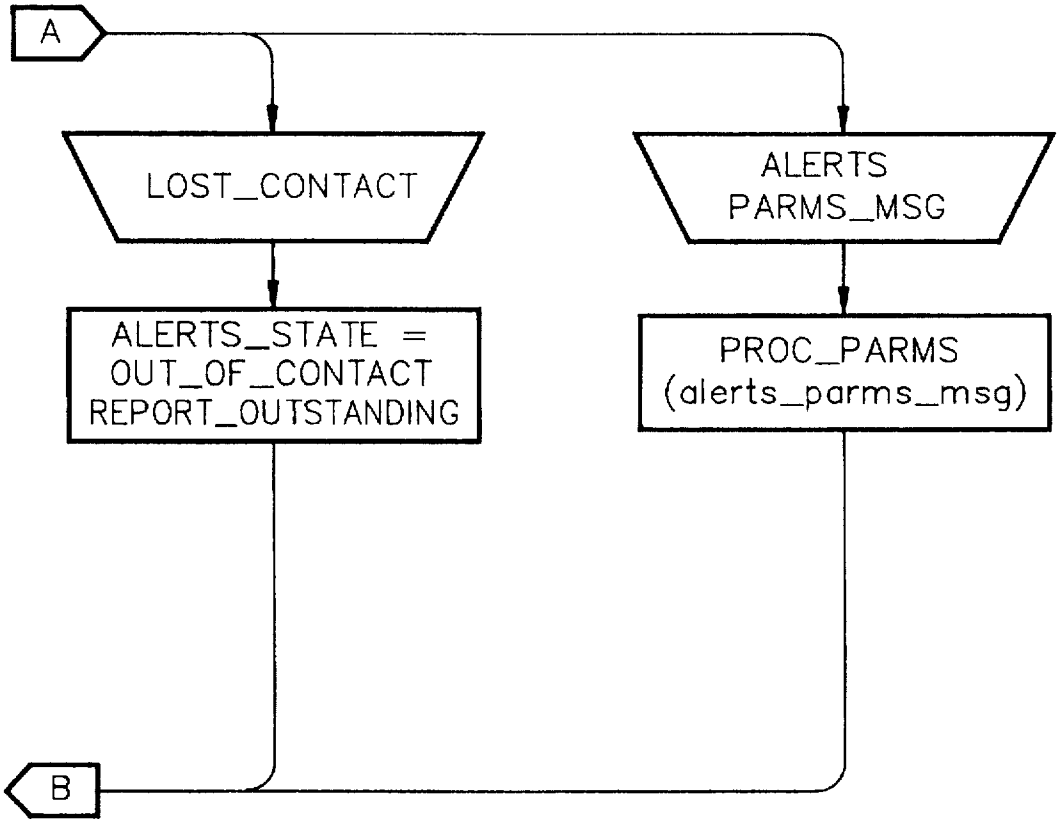

Procedure S_RPT_OUTSTANDING is shown in FIGS. 12*a* and 12*b* as including the step of determining the case of variable ALERTS_EVENT. If variable ALERTS_EVENT is equal to any of the values CHANGE_TO, RESEND_TO, CLIENT_CHNG or PORT_DOWN, variable ALERTS_STATE is set to the value CHG_PENDING_RPT_OUTSTANDING and procedure S_RPT_OUTSTANDING is exited. If variable ALERTS_EVENT is equal to the value DELIV_BAD, procedure PROC_FAIL is called and upon returning from that procedure, procedure START_RS_TMR is called. When the application returns from that procedure, procedure S_RPT_OUTSTANDING is exited. If variable ALERTS_EVENT is equal to the value RESEND_TO, procedure GEN_RPT (shown in FIG. 16) is called. Then, depending upon the value of variable RETURN_CODE, the procedure may follow one of two paths. If RETURN_CODE equals the value True, procedure S_RPT_OUTSTANDING is exited. If, however, variable RETURN_CODE equals False, variable ALERTS_STATE is set to the value IDLE and the procedure is exited. In the case where variable ALERTS_EVENT is equal to the value DELIV_OK, variable ALERTS_STATE is set to the value IDLE and the procedure PROC_SUCCESS is called. Upon returning from procedure PROC_SUCCESS, procedure S_RPT_OUTSTANDING is exited. When the value of variable ALERTS_EVENT is equal to the value HEALTH-RPT, procedure PROC_HEALTH is called and upon returning from procedure PROC_HEALTH, procedure S_RPT_OUTSTANDING may follow one of two paths depending on the value of variable RETURN_CODE. If the value of variable RETURN_CODE equals False, procedure S_RPT_OUTSTANDING is exited. If, however, variable RETURN_CODE is True, variable ALERTS_STATE is set to the value CHG_PENDING_RPT_OUTSTANDING and procedure S_RPT_OUTSTANDING is exited.

FIG. 12*b* shows the remaining two branches of procedure S_RPT_OUTSTANDING. If variable ALERTS_EVENT is equal to the value LOST_CONTACT, variable ALERTS_STATE is set to the value OUT_OF_CONTACT_REPORT_OUTSTANDING and the procedure is exited. Finally, if variable ALERTS_EVENT is equal to the value ALERTS_PARMS_MSG, procedure PROC_PARMS is called and after returning from that procedure, procedure S_RPT_OUTSTANDING is exited. The application then returns to the main program ALERTS_FSM.

Figure 13:
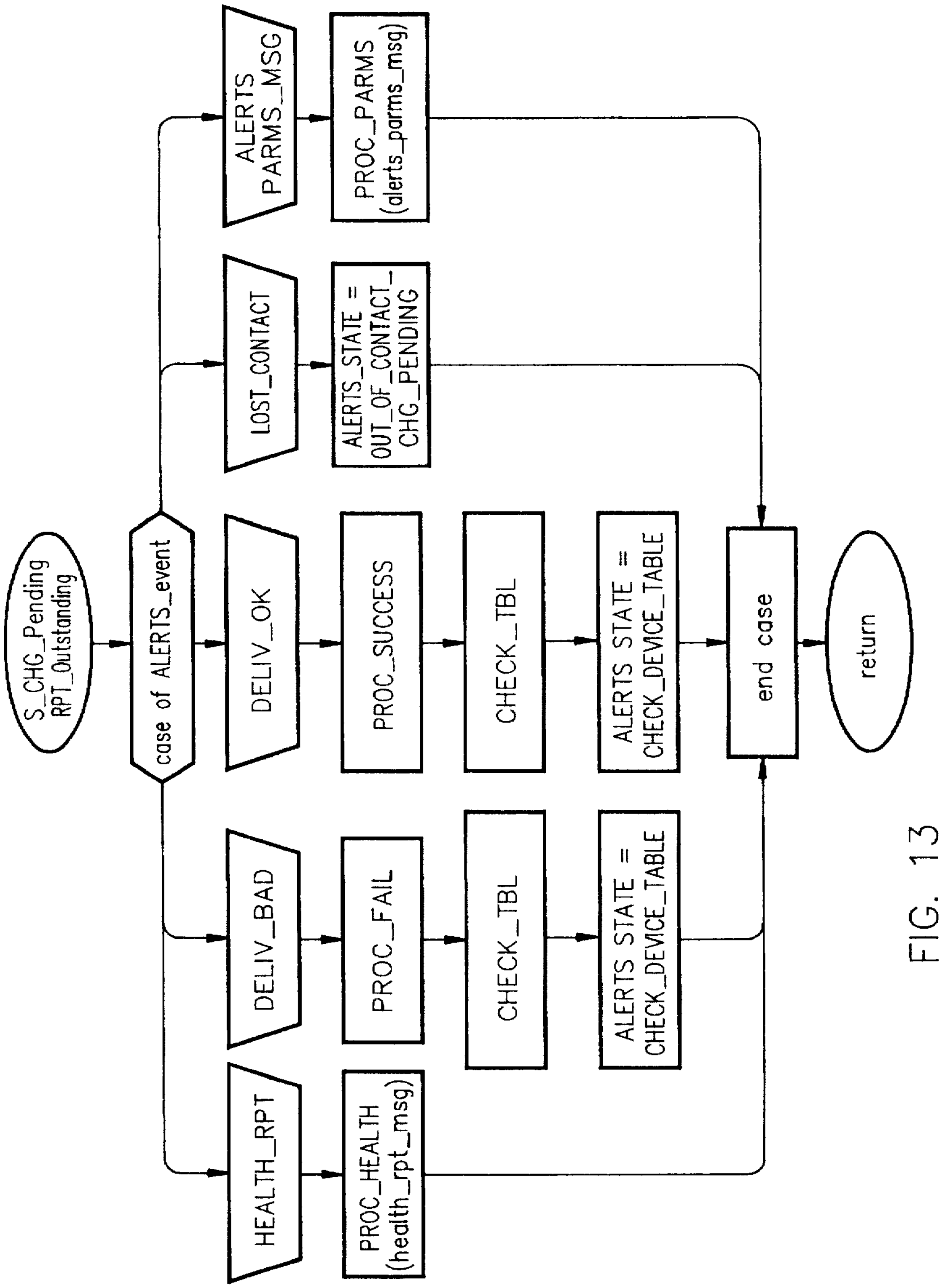

The last of the possible state values for variable ALERTS_STATE is shown in FIG. 13 in the flowchart for procedure S_CHG_PENDING_RPT_OUTSTANDING. Similar to those procedures discussed previously, the case of variable ALERTS_EVENT determines which path will be selected by the procedure S_CHG_PENDING_RPT_OUTSTANDING. If the value of variable ALERTS_EVENT is equal to the value HEALTH_RPT, procedure PROC_HEALTH is called and upon returning from that procedure, procedure S_CHG_PENDING_RPT_OUTSTANDING is exited. If the value of variable ALERTS_EVENT is equal to the value DELIV_BAD, procedure PROC_FAIL is called, followed by the calling of procedure CHECK_TBL, followed by the assigning of variable ALERTS_STATE the value of CHECK_DEVICE_TABLE. The procedure is then exited. If the value of variable ALERTS_EVENT is equal to the value Deliv-Okay, procedures PROC_SUCCESS and CHECK_TBL are called in succession and upon returning from procedure CHECK_TBL, variable ALERTS_STATE is set to the value of CHECK_DEVICE_TABLE. The procedure S_CHG_PENDING_RPT_OUTSTANDING is then exited. If the value of variable ALERTS_EVENT is equal to the value LOST_CONTACT, variable ALERTS_STATE is set to the value OUT_OF_CONTACT_CHG_PENDING and the procedure is exited. Finally, if the value of variable ALERTS_EVENT is equal to the value ALERTS_PARMS_MSG, procedure PROC_PARMS is called and upon returning from that procedure, procedure S_CHG_PENDING_RPT_OUTSTANDING is exited. After exiting procedure S_CHG_PENDING_RPT_OUTSTANDING, the application returns to main procedure ALERTS_FSM.

Figure 14A:
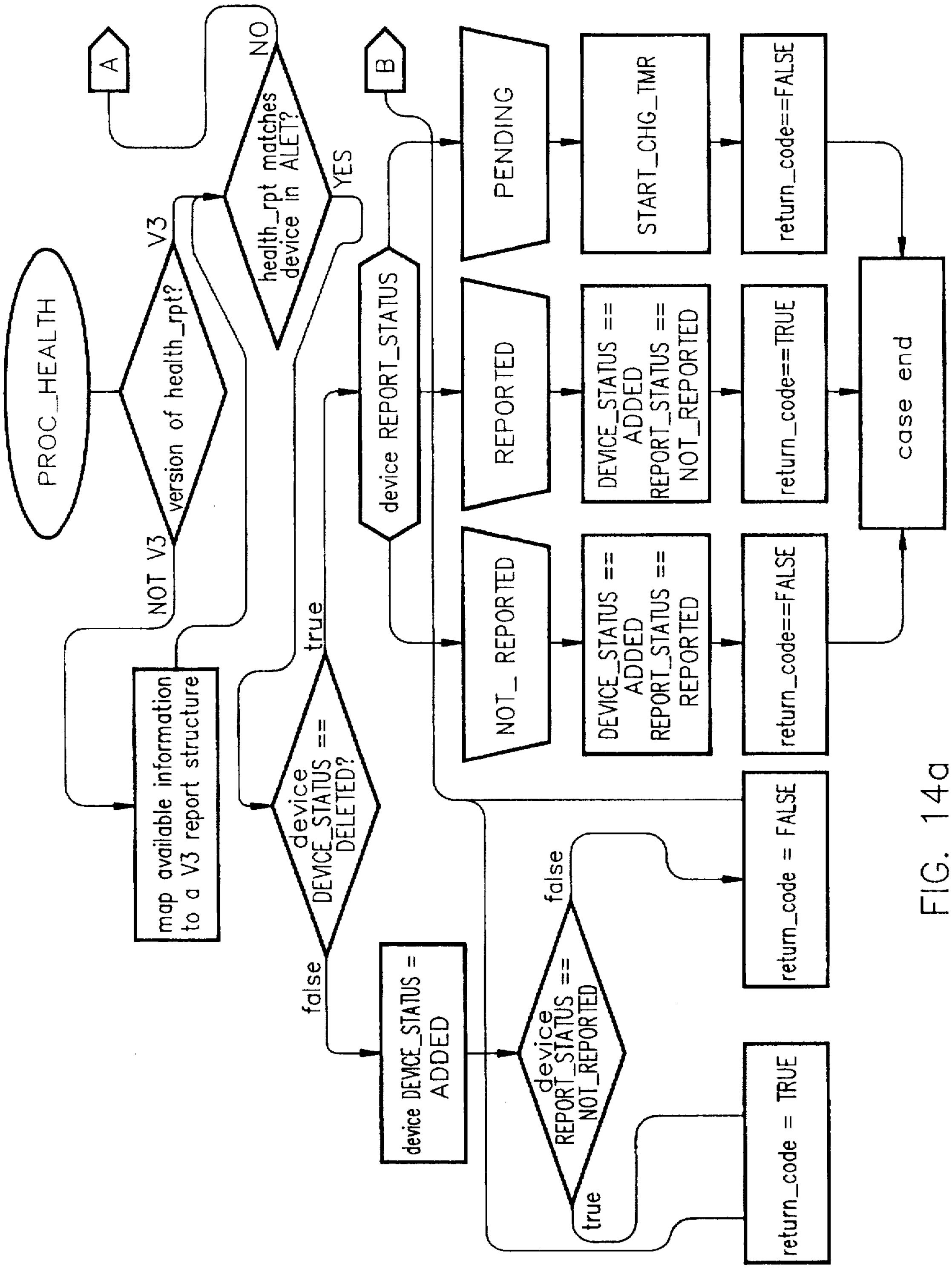
Figure 14B:
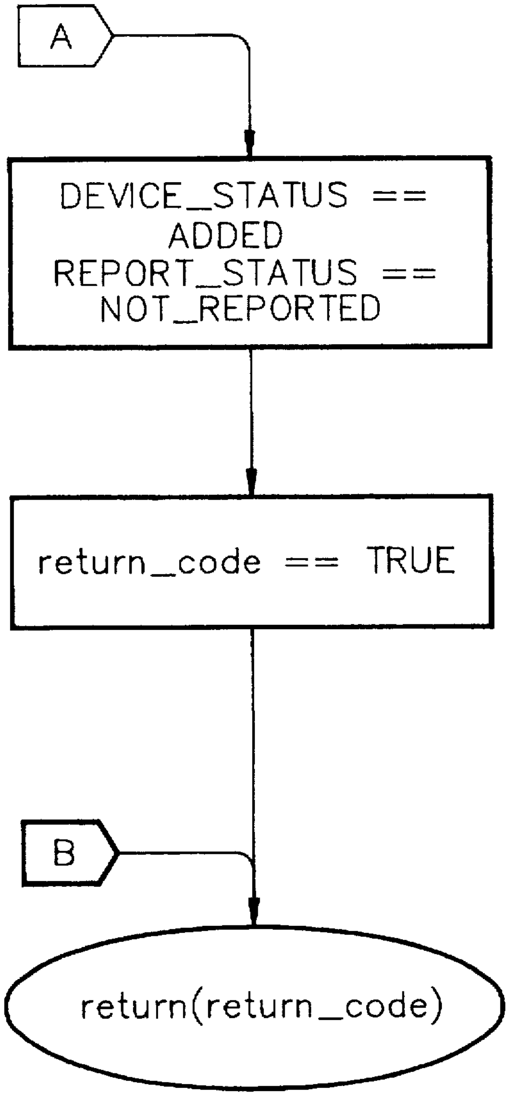

FIGS. 14*a* and 14*b* show procedure PROC_HEALTH, which was discussed previously in this disclosure. Likewise, FIG. 15 discloses procedure CHECK_TBL, which was described in connection with the start-up of the ALERTS application.

FIG. 16 discloses procedure PROC_SUCCESS which is called in response to variable ALERTS_EVENT equaling the value DELIV_OK, as shown in the State-Event chart in FIG. 4. Procedure PROC_SUCCESS checks each device in the Active Locomotive Equipment Table to see if the variable REPORT_STATUS for each device is equal to the value PENDING. If it is not, the procedure simply goes on to the next device. If, however, variable REPORT_STATUS is equal to the value PENDING, the variable REPORT_STATUS for that device is assigned the value REPORTED and the next device in the table is examined. After all of the devices are checked, the application returns to the procedure from which procedure PROC_SUCCESS was called.

FIG. 17 discloses procedure GEN_RPT, which was discussed previously. FIG. 18, however, discloses procedure PROC_FAIL, which is called in response to variable ALERTS_EVENT equaling the value DELIV_BAD. It simply consists of checking each device in the ALET to see if the variable REPORT_STATUS for that device is equal to the value PENDING. If it is, then the variable REPORT_STATUS for that device is changed to the value NOT_REPORTED. Otherwise, after each device is checked, the procedure is finished.

Figure 19:
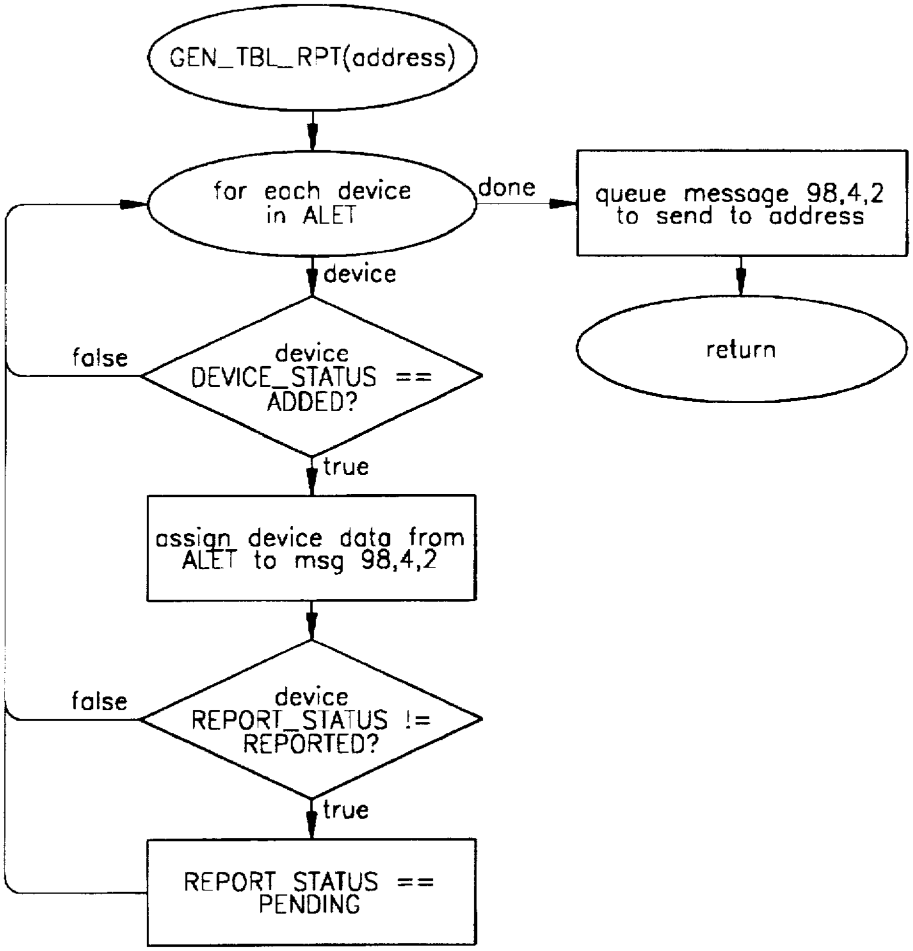

FIG. 19 discloses procedure GEN_TBL_RPT, which is called in response to variable ALERTS_EVENT having a value of PERIODIC_TO or REPORT_REQ and is used to generate a table report to a specified address in the front end processor 46. The procedure checks each device in the ALET to determine if the variable DEVICE_STATUS for each device is equal to the variable ADDED. If it is not, the procedure goes on the check the next device in the table. If, however, the variable DEVICE_STATUS is equal to the value ADDED, the device data in the Active Locomotive Equipment Table is assigned to message 98.4.2 which, in the preferred embodiment, represents the locomotive equipment list report. The value of variable REPORT_STATUS for the device is then checked. If the value of variable REPORT_STATUS for the device is equal to the value REPORTED, the procedure moves on to check the next device in the table. However, if the value of variable REPORT_STATUS for the device is equal to the value NOT_REPORTED, variable REPORT_STATUS is set to the value PENDING and the next device in the table is checked. Once all the devices in the Active Locomotive Equipment Table are checked, message 98.4.2 is queued to send to a predetermined address in the front-end processor 46. Of course, this address is configurable through various commands which will be discussed below. Following the queuing of message 98.4.2 to send to the predetermined address, the application returns from procedure GEN_TBL_RPT.

Figure 20:
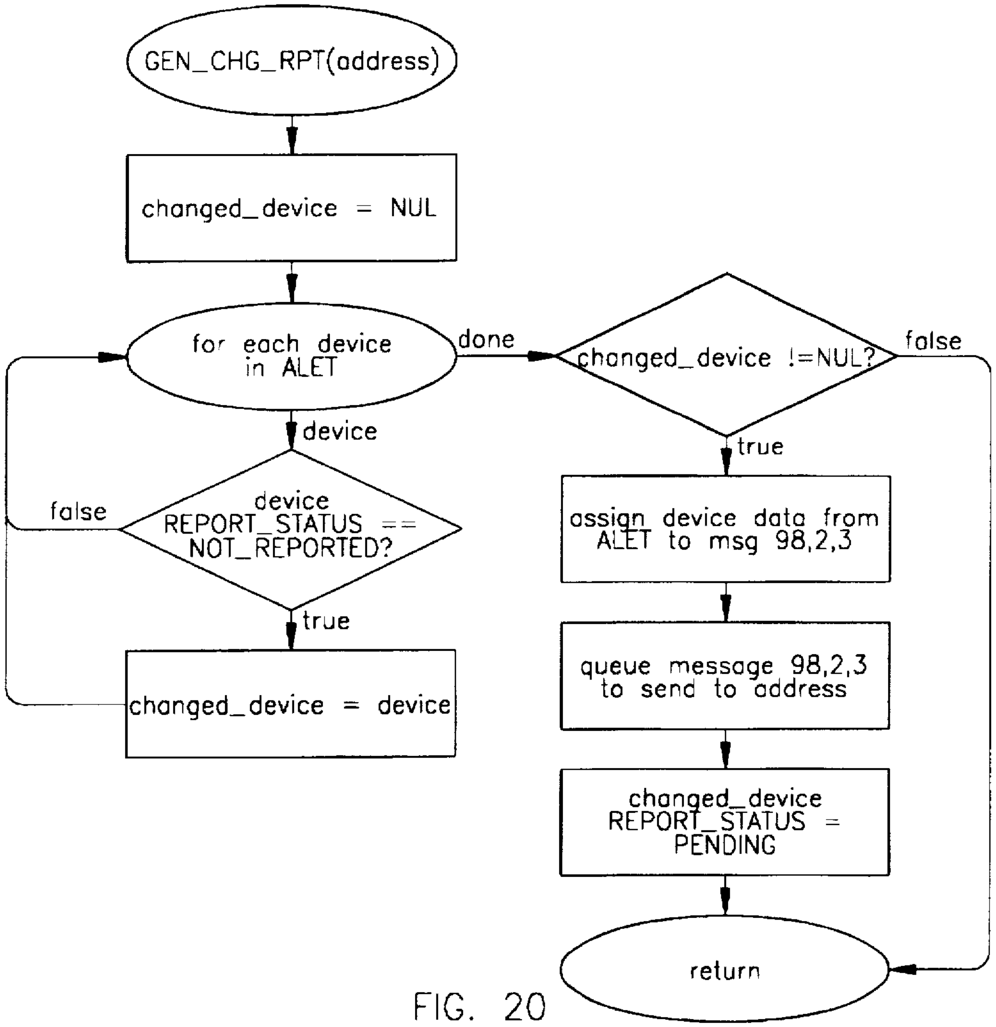

FIG. 20 discloses procedure GEN_CHG_RPT, which is called when a single new device is added or deleted from the system. Procedure GEN_CHG_RPT begins by assigning variable CHANGED_DEVICE the value of Null and proceeds to check each device in the ALET to see if variable REPORT_STATUS for that device is equal to the value NOT_REPORTED. If the value for the variable REPORT_STATUS for the particular device being checked is not equal to the value NOT_REPORTED, the procedure goes on to check the next device in the table. If, however, the variable REPORT_STATUS for that device is equal to the value NOT_REPORTED, variable CHANGED_DEVICE is set to the value DEVICE, thus specifically noting which device has not reported. After each device in the table is checked, the value of variable CHANGED_DEVICE is checked. If the value of variable CHANGED_DEVICE is equal to the value Null, the procedure is exited. Otherwise, if the value of variable CHANGED_DEVICE is not equal to the value Null, the device data corresponding to the device whose variable REPORT_STATUS was equal to the value NOT_REPORTED is assigned from the ALET to message 98.2.3, which is an equipment change report comprising a boolean indicator which indicates a device going active or inactive. The message is then queued to send to the predetermined address in the front-end processor 46 and the variable REPORT_STATUS for the device which has changed status is assigned the value PENDING. The procedure is then exited.

FIG. 21 discloses procedure START_CHG_TMR which either resets or starts the change timer running. In procedure START_CHG_TMR, the procedure first checks to see if the change timer is running. If it is, the change timer is reset and the procedure is exited. If the change timer is not running, the timer is started and the procedure is exited. The device change timer is designed to prevent reporting that a device is down when it is actually going through reset. The ALERTS application will wait that amount of time after all clients associated with the device go inactive before reporting a device down to the front-end processor 46. This timer is default set to 120 seconds, but is configurable depending on if the end user wishes to have more rapid updates of downed devices.

Figure 22:
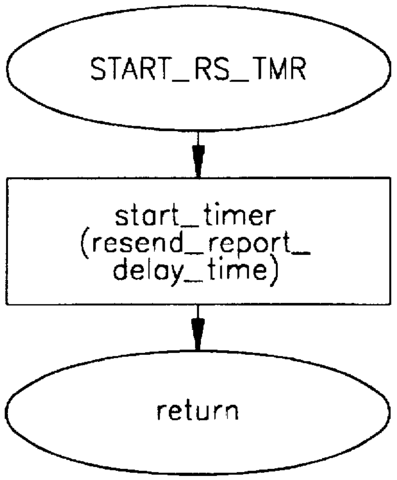

FIG. 22 discloses the procedure START_RS_TMR which simply starts the reset report delay timer to initiate resend of the table to the front-end processor 46 if the table was not successfully sent the previous try.

Figure 23:
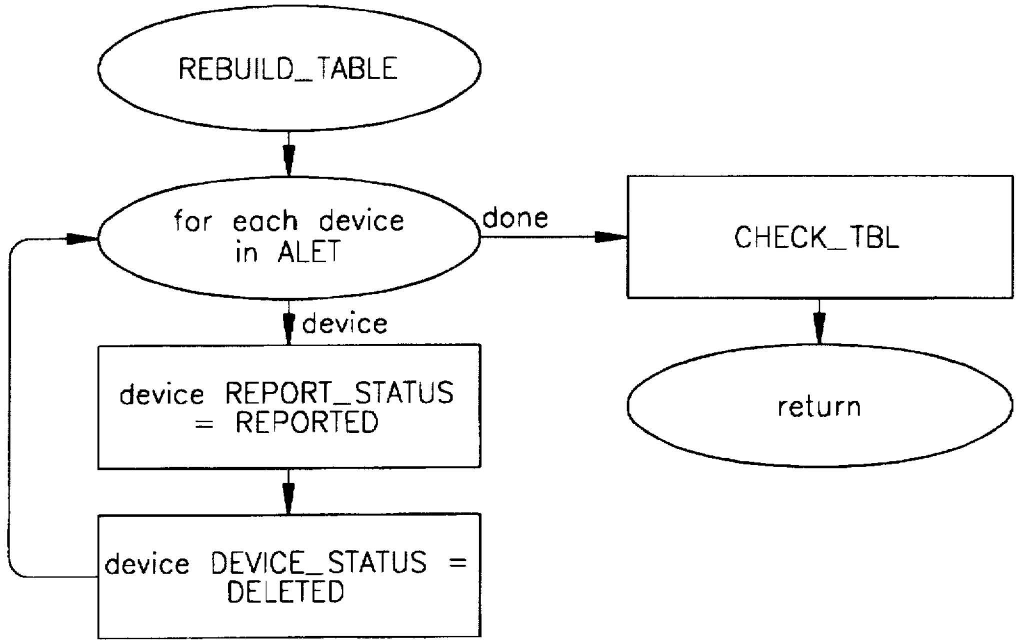

FIG. 23 discloses the procedure REBUILD_TABLE which is called when a report is requested (i.e. variable ALERTS_EVENT is equal to the value REPORT_REQ). In procedure REBUILD_TABLE, each device in the ALET is checked, with variable REPORT_STATUS for each device being set to the value REPORTED and variable DEVICE_STATUS for each device being set to the value DELETED. After this operation is performed for each device in the table, procedure CHECK_TBL (shown in FIG. 22) is called. Upon returning from procedure CHECK_TBL, procedure REBUILD_TABLE is exited.

Finally, FIG. 24 shows procedure PROC_CHK_TO, which was described previously in connection with the startup of the ALERTS application 10.

Procedure PROC_PARMS is not shown in flow chart form as procedure PROC_PARMS merely functions to accept configuration change messages from the front end processor 46 to reconfigure those configurable items in the ALERTS application. For example, the periodic timer may be reset to issue a locomotive equipment list report (message 98.4.2) periodically after a specified time has elapsed. A dispatcher may wish to view an updated equipment list report every half hour, for example, depending on the job to which the locomotive is assigned. The dispatcher would then transmit a message over the base networking system to the mobile communications package 12 which would include an instruction to reconfigure the time setting for the periodic timer. Procedure PROC_PARMS would interpret the received message and reconfigure the periodic timer. It is believed that such simple reconfiguration of reconfigurable variables would be understood to one skilled in the art. Therefore, a flow chart for procedure PROC_PARMS is not included herewith.

It is believed that one skilled in the art will be able to follow the flowcharts provided herein to determine the exact methods by which the ALERTS application of the present invention achieves the tracking of on-board equipment. FIGS. 3 and 4 are provided to further clarify the workings of the present invention. FIGS. 3*a* and 3*d* are particularly helpful in understanding the present invention as they disclose which form of report is sent to the front-end processor 46 depending upon the situation encountered by the ALERTS application. For example, in FIG. 3*a*, if a multiple device, multiple client deletion occurs, and the MCP is in contact with the front-end processor and the device does not recover before the device change timer expires, message 98.4.2, which is the equipment list report, is sent to the front-end processor. Optionally, an equipment change report, message 98.2.3, may be sent for each device deleted. FIG. 4 displays the state/event chart showing that when a particular value of ALERTS_EVENT and a particular value of variable ALERTS_STATE are present, a particular procedure is called. For example, if the value of variable ALERTS_STATE is equal to the value REPORT_OUTSTANDING and the value of variable ALERTS_EVENT is equal to the value DELIV_BAD, procedure PROC_FAIL and procedure START_RS_TMR are called, as is also shown in the flowchart of FIG. 12*a*.

The above description should clearly illustrate the preferred organization for the ALERTS application in the MCP 12. It is preferred that the application will be implemented in the C++ programming language, although it is to be understood that a variety of programming languages will be suitable for implementing the above-described ALERTS application for the MCP, any of which would be suitable for use by one skilled in the art. Alternatively, all configurable parameters and the program for the ALERTS application 10 may be placed in a separate ROM chip and inserted into a separate ROM socket on the main processor side of the system board on the MCP 12.

The configurable items in the ALERTS application 10 have been discussed previously, and include such items as the ALET initialization delay time, ALET initial report time, down device report delay time, ALET periodic report timer, default ALET report address and ALERTS entity address. Messages may be sent from the front end processor 46 to the MCP 12 to configure those items discussed above, including modification of the ALET periodic report timer by transmission of message 98.3.4 and modification of default ALET report address by transmission of message 98.3.6. The changes are interpreted and implemented by procedure PROC_PARMS, and as was previously discussed, it is to be understood that one skilled in the art of changing configurable items would understand how to implement procedure PROC_PARMS.

Turning to the ALERTS application in the front-end processor (FEP) 46, it is seen that this end of the application will maintain a database of locomotive equipment as previously described. Methods for maintaining an equipment database are well known in the prior art, however, in the present invention, several unique features are included which pertain specifically to the equipment state and locomotive state. Equipment information is stored in the database along with an indication as to the state of the equipment on board the locomotive. In the preferred embodiment, equipment in the database may be in one of four states. ACTIVE indicates the equipment is active and operating on board the locomotive. INACTIVE indicates the equipment was last reported to be on the locomotive but is no longer being detected; this could indicate powered down, faulty or removed equipment. UNKNOWN status indicates equipment that was last reported active or inactive on this locomotive is no longer detected on board and a functionally equivalent piece of equipment is active on this locomotive; this would typically indicate this piece of equipment has been replaced on the locomotive and has not been reassigned. The final state equipment may be in is OUT-OF-SERVICE; this status may be set by the customer service representative, dispatcher or field unit, and indicates that the equipment has been removed for repair or maintenance or for some other reason.

Each of the above defined equipment states is stored with the respective piece of equipment on board the locomotive. Each equipment list is specific to a particular locomotive and is stored as a single accessible unit in the front-end processor. Each packet of locomotive information further includes an indication as to the state of the locomotive. The states are as follows: NOT-IN-DATABASE is self-explanatory. OPERATIONAL indicates the locomotive is active and ALERTS equipped. NON-OPERATIONAL indicates the locomotive is ALERTS equipped, however it has been out of contact for more than its Max-Out-of-Contact time. When a locomotive becomes non-operational, alarms and notices are generated to indicate potential problems. OUT-OF-SERVICE indicates the locomotive has been taken out of service (i.e. for routine shopping, loaned power, etc.). Equipment status is kept on OUT-OF-SERVICE locomotive equipment, but no alarms are generated on equipment changes. NON-ALERTS indicates the locomotive is in contact but is not equipped with the ALERTS application. OPERATIONAL, OUT-OF-SERVICE, and NON-ALERTS states are combined with the locomotive contact status from LMON (the Locomotive Monitor function and database in ABNS) to create unique states for each when in and out of contact.

The front-end processor ALERTS application will also maintain an audit trail log of all equipment status changes. This is simply and quickly done by establishing a file into which equipment status changes are preferably chronologically entered. Accessing and establishing such a file is well known in the prior art.

The ABNS component LMON will report loss of mobile contact along with the last base station with the highest SSI in contact with that mobile. LMON will also report acquired mobiles. The base network system already includes component LMON, and therefore that element of the ALERTS application will not be discussed further in this specification.

It is preferred that the ALERTS application and the front-end processor include the following features:

1. The ALERTS application will generate downed mobile equipment reports to EMS and to the host on the receiving end of the equipment change report (message 98.2.3) indicating a device going inactive;
2. The ALERTS application will generate activated mobile equipment reports to EMS and the host on receiving an equipment change report (message 98.2.3) indicating a device has gone active;
3. The ALERTS application will generate both activated and downed device reports while processing mobile equipment list reports when the current active equipment does not match what shows active in the database;
4. The ALERTS application will detect duplicate equipment entries in the database and generate appropriate reports and alarms;
5. The ALERTS application will accept messages from the host indicating equipment is being taken out of service for repair and maintenance and prevent alarms from being generated on that equipment, the equipment database will be maintained normally during out of service periods; and
6. The ALERTS application will set a MAX_OUT_OF_CONTACT_TIME for each locomotive. The MAX_OUT_OF_CONTACT_TIME may be manually overridden to an alternative time period or to force immediate reports and alarms on loss of contact. The MAX_OUT_OF_CONTACT_TIME will normally be updated when contact is lost on a locomotive, based on the base station with the highest SSI which last heard the mobile. The precedence order for setting the MAX_OUT_OF_CONTACT_TIME is first by manual set, second by base station last heard from, and finally by the default out-of-contact-time. This information is stored in a database which may be accessed to determine how long certain locomotives have been out of contact.

To clarify, EMS stands for the Event Management System, which is a co-resident system with ABNS and is concerned with Tandem system real time event logging and operator reporting. As an example of EMS function, if ALERTS detected a device change, ALERTS would notify EMS which would post a device change message on an appropriate display terminal.

The third section of the ALERTS application is found in the ICE (Interface Control Environment) system interface, which provides the operator interface to ABNS and therefore to ALERTS. Operation screens and the necessary programming for the following functions are included:

1. Inquiry to the ALERTS database or directly to a mobile field unit for equipment list information;
2. Display the last (n) equipment alarms with date and time where n is the number of equipment alarms;
3. Show all inactive locomotive equipment;
4. Set MAX_OUT_OF_CONTACT_TIME for a mobile field unit or a base station;
5. Generate a report of Non-ALERTS mobile field units;
6. Generate a report of Non-Operational mobile field units; and
7. Generate a report of equipment changed between two specific dates or times.

It is to be understood that each of the above-described operation screens are easily and quickly implemented by anyone skilled in the art of database interface and therefore it is believed that further description of the implementation of the ICE operator interface for the ALERTS system is unnecessary. Furthermore, it is to be understood that various database interfaces may be implemented instead of ICE, such as a Windows-based interface, so long as the desived information in the ALET may be quickly and easily accessed.

Because the application of the present invention is designed to "piggy back" on the already existing ABNS and ATCS systems, the ALERTS application may be quickly and easily integrated into the locomotive systems such as the MCP and into the system in the front-end processor. Additionally, because the application provides real-time updates regarding intelligent device changes on-board a remote locomotive, a dispatcher at a remote location can quickly respond to the indication of missing devices and contact the locomotive in question to determine the events taking place on board the locomotive. Previously, if devices were removed or stolen from the locomotive, there was no way by which a remote dispatcher could determine the time or location where a particular device was removed from the locomotive unit. The ALERTS application is specifically designed to obtain such information from intelligent devices on board the locomotive, transmit that information to the front-end processor and store the information in easily accessible packets such that an operator of the application may determine the extent and time of device changes. It is thus seen that the present invention provides a substantial improvement over those devices found in the prior art.

It is to be understood that numerous modifications, additions and substitutions may be made to the ALERTS application of the present invention which fall within the intended broad scope of the appended claims. For example, the ALERTS application may be implemented in a different programming language or may be implemented in a different system than ABNS and/or ATCS. Also, tracking and reporting of additional equipment than that described above may be implemented to provide complete system-wide coverage for all field units in the system. Finally, the exact procedures followed to facilitate the operation of the ALERTS application may be modified so long as the modified application performs substantially the same function as the application described above.

There has thus been set forth and described a locomotive equipment reporting and tracking system which accomplishes at least all of the stated objectives.

We claim:

1. An apparatus for tracking, reporting and recording equipment inventory on a railroad field unit equipped with a mobile communications package (MCP) operatively connected to on-board intelligent devices and operative to transmit and receive information to and from at least one remote base communications unit, the intelligent devices operatively connected in a local communications network, said apparatus comprising;

processing means operative to broadcast a Query for Health Report to on-board intelligent devices and receive Health Report messages from on-board intelligent devices, wherein said Query for Health Report comprises a request for equipment identification information and said Health Report messages comprise the requested equipment identification information;

equipment identification information storage means in information transmission connection with said processing means, said storage means operative to receive and store equipment identification information received by said processing means via said Health Report messages;

polling means operatively connected to said processing means for periodically initiating broadcasting of said Query for Health Report to on-board intelligent devices on a railroad field unit;

temporary information storage means in information transmission connection with said processing means for initially receiving and storing recently received equipment identification information from a locomotive via Health Report messages received in response to said Query for Health Report;

comparing means in said processing means for comparing equipment identification information in said temporary information storage means to equipment identification information in said equipment identification information storage means for a particular field unit to determine additions and deletions of intelligent equipment on the field unit; and reporting and notifying means in information transmission connection with said processing means for reporting intelligent devices on-board a field unit and for notifying an operator of a change of intelligent devices on a field unit.

2. The apparatus of claim 1 further comprising a front end processor and cluster controller combination in information transmission connection with the mobile communications packages on a plurality of locomotives via the remote base communications units, said front end processor and cluster controller combination situated remotely from said remote base communications units and including a computing device and programming software for facilitating communications between said front end processor and the mobile communications packages on a plurality of locomotives.

3. The apparatus of claim 2 wherein said processing means comprises a locomotive equipment reporting and tracking software application in an MCP programmed to broadcast said Query for Health Report to on-board intelligent devices on a locomotive, the on-board intelligent devices including means for recognizing said Query and for responding by transmitting Health Report messages to said MCP, the locomotive equipment reporting and tracking software application compiling said Health Report messages and storing said Health Report messages, specifically equipment information therein, in said equipment identification information storage means.

4. The apparatus of claim 3 wherein said equipment identification information storage means comprises an active locomotive equipment table database operative to receive, store and organize the equipment identification information received by said locomotive equipment reporting and tracking software application in connection with a plurality of Health Report messages as an active locomotive equipment table.

5. The apparatus of claim 4 wherein said locomotive equipment reporting and tracking software application is operative to transmit said active locomotive equipment table to said front end processor and said cluster controller combination, said transmission of said active locomotive equipment table only occurring when the MCP and the front end processor are in information transmission connection.

6. The apparatus of claim 5 wherein said front end processor further comprises a maximum out-of-contact time database operative to receive and store contact information generated by the remote base communications units to determine if a locomotive has been out of contact for an extended period, signifying a potential problem.

7. The apparatus of claim 6 wherein said locomotive equipment tracking software application further comprises monitoring means operative to monitor on-board intelligent devices to determine changes to on-board device inventory on a locomotive, said locomotive equipment tracking software application transmitting an equipment change message to said front end processor upon discovery of an device change by said monitoring means.

8. The apparatus of claim 7 wherein said polling means comprises an initiating application in operative connection with the mobile communications package on the locomotive, said polling means operative to initiate broadcast of said Query for Health Report to on-board intelligent devices upon sending of said equipment change report by the mobile communications package to said front end processor, said equipment change report comprising a boolean indicator indicating whether the particular device is active on the locomotive.

9. The apparatus of claim 8 wherein said front end processor further comprises an audit trail file of all changes in equipment on the locomotive, said file comprising a chronological entry database is determined by said comparing means for maintaining a history of equipment changes on board a particular locomotive.

10. The apparatus of claim 9 wherein said temporary information storage means comprises a temporary database in information transmission connection with said locomotive equipment reporting and tracking software application.

11. The apparatus of claim 10 wherein said reporting and notifying means comprises a report generating device in information transmission connection with said front end processor for generating equipment list reports, downed mobile equipment reports, activated mobile equipment reports, duplicate equipment entry reports, and non-operational status reports and alarm means for notifying an operator of incoming report and irregularities.

12. A method of tracking, reporting and recording equipment inventory on a locomotive equipped with a mobile communications package (MCP) operatively connected to on-board intelligent devices and operative to transmit and receive information to and from at least one remote base communications unit, the on-board intelligent devices operatively connected in a local communications network, said method comprising the steps;

providing processing means, equipment identification information storage means, monitoring means, polling means, temporary information storage means, comparing means and reporting and notifying means;

connecting said processing means to on-board intelligent devices, said processing means, said equipment identification information storage means and said temporary information storage means in information transmission connection with one another;

broadcasting a Query for Health Report through said processing means to on-board intelligent devices, said Query for Health Report comprising a request for equipment identification;

receiving Health Report messages through said processing means from the on-board intelligent devices, said Health Report messages comprising equipment identification information for intelligent devices operatively connected to the processing device;

storing said Health Report messages in said equipment identification information storage means;

monitoring on-board intelligent devices through said monitoring means to determine activation status of devices operatively connected to said processing means;

initiating broadcast of a Query for Health Report through said polling means to the on-board intelligent devices in response to said monitoring means registering one of the addition and deletion of an intelligent device;

receiving said updated Health Report messages by said processing means and storing said updated Health Report messages in said temporary information storage means;

comparing said Health Report messages stored in said equipment identification information storage means and said updated Health Report messages stored in said temporary information storage means through said comparison means;

reporting any differences in said updated Health Report messages as compared to said Health Report messages such that equipment changes are reported to an operator at a remote location; and replacing said Health Report messages in said equipment identification information storage means with said updated Health Report messages in said temporary information storage means such that said equipment identification information storage means stores the most recent updated Health Report messages.

13. The method of claim 12 wherein said step of reporting any differences in said updated Health Report messages as compared to said Health Report messages further comprises reporting malfunctions, thefts, destructions and systems updates of intelligent devices operatively connected to said processing means.

* * * * *